(12) United States Patent
Yoshikawa et al.

(10) Patent No.: US 7,971,089 B2
(45) Date of Patent: Jun. 28, 2011

(54) SWITCHING CONNECTION OF A BOOT DISK TO A SUBSTITUTE SERVER AND MOVING THE FAILED SERVER TO A SERVER DOMAIN POOL

(75) Inventors: Shigehiro Yoshikawa, Kawasaki (JP); Yoshinobu Hibi, Kawasaki (JP); Hideyuki Tanaka, Kawasaki (JP); Masayuki Naitou, Kawasaki (JP); Satoshi Iyoda, Kawasaki (JP); Sachiko Terai, Kawasaki (JP); Sawao Iwatani, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 11/787,652

(22) Filed: Apr. 17, 2007

(65) Prior Publication Data

US 2007/0234116 A1 Oct. 4, 2007

Related U.S. Application Data

(63) Continuation of application No. PCT/JP2004/015383, filed on Oct. 18, 2004.

(51) Int. Cl.
*G06F 11/00* (2006.01)
(52) U.S. Cl. .............................. 714/4; 714/13
(58) Field of Classification Search .................. None
See application file for complete search history.

(56) References Cited

U.S. PATENT DOCUMENTS

| | | | |
|---|---|---|---|
| 5,400,325 A | 3/1995 | Chatwani et al. | |
| 5,812,751 A | 9/1998 | Ekrot et al. | |
| 5,996,086 A | 11/1999 | Delaney et al. | |
| 6,163,856 A * | 12/2000 | Dion et al. | 714/4 |
| 6,453,426 B1 * | 9/2002 | Gamache et al. | 714/4 |
| 6,535,998 B1 * | 3/2003 | Cabrera et al. | 714/15 |
| 6,597,956 B1 | 7/2003 | Aziz et al. | |
| 7,093,124 B2 * | 8/2006 | Girard | 713/164 |
| 7,124,322 B1 * | 10/2006 | Backman | 714/15 |
| 7,287,186 B2 * | 10/2007 | McCrory et al. | 714/13 |
| 7,305,452 B2 | 12/2007 | Sakatani | |

(Continued)

FOREIGN PATENT DOCUMENTS

JP 63-104166 5/1988

(Continued)

OTHER PUBLICATIONS

Intel: "Preboot Execution Environment (PXE) Specification, Version 2.1"; Internet Citation, [Online]; Sep. 29, 1999; URL:http://www.pix.net/software/pxeboot/archive/pxespec.pdf> [retrieved on Oct. 11, 2006].

(Continued)

*Primary Examiner* — Gabriel L Chu
(74) *Attorney, Agent, or Firm* — Greer, Burns & Crain, Ltd.

(57) ABSTRACT

When a server RM detects a failure in an operating server, a system resource manager selects a substitute server from a pool of a server domain to which a failed server belongs, based on information in a system resource DB, disconnects the failed server from a business network and a storage sub group and moves the failed server to a pool, and permits the substitute server to access a storage group to which the failed server had an access and to connect to the business network to which the failed server was connected, to boot up the substitute server from a SAN.

15 Claims, 44 Drawing Sheets

U.S. PATENT DOCUMENTS

| | | | |
|---|---|---|---|
| 7,325,156 B1 | 1/2008 | Schloss et al. | |
| 7,478,275 B1* | 1/2009 | Deolasee et al. | 714/13 |
| 7,574,620 B2* | 8/2009 | Hartung | 714/4 |
| 2002/0059263 A1 | 5/2002 | Shima et al. | |
| 2002/0075321 A1 | 6/2002 | Sakatani | |
| 2002/0091854 A1 | 7/2002 | Smith | |
| 2002/0120744 A1 | 8/2002 | Chellis et al. | |
| 2003/0097422 A1 | 5/2003 | Richards et al. | |
| 2003/0126202 A1 | 7/2003 | Watt | |
| 2003/0126242 A1* | 7/2003 | Chang | 709/222 |
| 2003/0130832 A1 | 7/2003 | Schulter et al. | |
| 2003/0177239 A1 | 9/2003 | Shinohara et al. | |
| 2004/0047354 A1 | 3/2004 | Slater et al. | |
| 2004/0054780 A1 | 3/2004 | Romero | |
| 2004/0068667 A1 | 4/2004 | Kumhyr et al. | |
| 2004/0107272 A1 | 6/2004 | Manukyan | |
| 2004/0107273 A1* | 6/2004 | Biran et al. | 709/223 |
| 2004/0117438 A1 | 6/2004 | Considine et al. | |
| 2004/0243796 A1 | 12/2004 | Keohane et al. | |
| 2005/0015471 A1 | 1/2005 | Zhang et al. | |
| 2005/0050356 A1* | 3/2005 | King et al. | 713/201 |
| 2005/0125212 A1* | 6/2005 | Hunt et al. | 703/21 |
| 2006/0047852 A1 | 3/2006 | Shah et al. | |
| 2006/0143498 A1* | 6/2006 | Hatasaki et al. | 714/4 |
| 2007/0067613 A1* | 3/2007 | Mizoguchi | 713/1 |
| 2007/0174658 A1* | 7/2007 | Takamoto et al. | 714/4 |
| 2007/0233872 A1 | 10/2007 | Yoshikawa et al. | |
| 2007/0234351 A1 | 10/2007 | Iyoda et al. | |
| 2007/0283422 A1 | 12/2007 | Iyoda et al. | |
| 2008/0133963 A1* | 6/2008 | Katano et al. | 714/4 |

FOREIGN PATENT DOCUMENTS

| | | |
|---|---|---|
| JP | 05-160876 | 6/1993 |
| JP | 07-121395 | 5/1995 |
| JP | 9-297692 | 11/1997 |
| JP | 2000-099359 | 4/2000 |
| JP | 2000-354062 | 12/2000 |
| JP | 2002-007174 | 1/2002 |
| JP | 2002-278769 | 9/2002 |
| JP | 2003-02190 | 1/2003 |
| JP | 2003-022190 | 1/2003 |
| JP | 2004-508616 | 3/2004 |
| JP | 2004-110791 | 4/2004 |
| JP | 2004-355624 | 12/2004 |
| WO | WO 01/80003 | 10/2001 |
| WO | 02/03203 A2 | 1/2002 |
| WO | WO 02/07037 | 1/2002 |

OTHER PUBLICATIONS

Akira Tsuneya; "New Management Technologies for Blade Servers;" Fujitsu Sci.Tech. Journal [Online] vol. 40, No. 1; Jun. 2004, pp. 141-150; URL:http://www.fujitsu.com/downloads/MAG/vol40-1/paper18.pdf> [retrieved Mar. 19, 2009].

Hirao et al.; "Resource Management;" Fujitsu Sci. Tech. Journal [Online] vol. 40, No. 1; Jun. 2004; pp. 123-132; URL:http://www.fujitsu.com/downloads/MAG/vol40-1/paper16.pdf> [retrieved Mar. 19, 2009].

Extended European Search Report issued by the European Patent Office for Application No. 10159527.0-224, mailed Jun. 28, 2010.

Japanese Office Action mailed Jun. 22, 2010 for Application No. JP 2006-542126 (with partial English language translation).

Japanese Office Action for No. 2006-542128 dated Jun. 22, 2010 with partial English language translation.

Yoshimura et al., "Server Allocation Policy for Improving Response on Web Access Peaks," The Transactions of the Institute of Electronics Information and Communication Engineers, IEICE, Sept. 1, 2002, vol. J85-D-I, No. 9, pp. 866-876 (JP-N6-08-042538).

* cited by examiner

FIG.5

SITE DATA
300

| SITE NAME | SITE MANAGEMENT SERVER NAME | DOMAIN MANAGEMENT SERVER NAME |
|---|---|---|
| DataCenter | SiteAdminSvrA | DomainAdminSvrA<br>DomainAdminSvrB |

FIG.6

DOMAIN MANAGEMENT SERVER DATA
310

| DOMAIN MANAGEMENT SERVER NAME | MANAGEMENT SUBNET NAME |
|---|---|
| DomainAdminSvrA | AdminSubnetA<br>AdminSubnetB |
| DomainAdminSvrB | Admin SubnetC |

FIG.7

MANAGEMENT SUBNET DATA
320

| MANAGEMENT SUBNET NAME | NETWORK ADDRESS | NETMASK | DEFAULT GATEWAY |
|---|---|---|---|
| AdminSubnetA | 192.168.1.0 | 255.255.255.0 | 192.168.1.1 |
| AdminSubnetB | 192.168.2.0 | 255.255.255.0 | 192.168.2.1 |
| AdminSubnetC | 192.168.3.0 | 255.255.255.0 | 192.168.3.1 |

FIG.8

MIDDLEWARE COOPERATION IF DATA
330

| MIDDLEWARE NAME | TARGET EVENT | TIMING | LOCATION | EXECUTION COMMAND |
|---|---|---|---|---|
| MW_A | SERVER GROUP CREATION | BEFORE<br>AFTER | MANAGER<br>MANAGER | -<br>issvgrp add |
| | SERVER GROUP DELETE | BEFORE<br>AFTER | MANAGER<br>MANAGER | issvgrp del<br>- |
| | SERVER ADDITION | BEFORE<br>AFTER | MANAGER<br>MANAGER<br>AGENT | isserver check<br>isserver add<br>- |
| | SERVER DELETE | BEFORE<br>AFTER | MANAGER<br>AGENT<br>MANAGER | isserver del<br>-<br>- |
| | SOFTWARE IMAGE EXTRACTION | BEFORE<br>AFTER | MANAGER<br>AGENT<br>MANAGER<br>AGENT | -<br>isproc stop<br>-<br>isproc start |
| | SOFTWARE IMAGE DISTRIBUTION | BEFORE<br>AFTER | MANAGER<br>MANAGER<br>AGENT | isserver check<br>isserver update<br>isproc start |

FIG.9

SERVER DOMAIN DATA
340 

| SERVER DOMAIN NAME | SERVER ARCHITECTURE NAME | MANAGEMENT SUBNET NAME |
|---|---|---|
| Web_domain | ARC_A | AdminSubnetA |
| AP_domain | ARC_B | AdminSubnetB |
| DB_domain | ARC_C | AdminSubnetC |

FIG.10

POOL GROUP DATA
350 

| POOL GROUP NAME | TYPE | SERVER DOMAIN NAME |
|---|---|---|
| Web_domain.pool | SERVER GROUP SHARING | Web_domain |
| AP_domain.pool | SERVER GROUP SHARING | AP_domain |
| DB_domain.pool | SERVER GROUP SHARING | DB_domain |
| A_DB.pool | SERVER GROUP ONLY | |
| B_DB.pool | SERVER GROUP ONLY | |

FIG.11

STORAGE DOMAIN DATA
360

| STORAGE DOMAIN NAME | REDUNDANCY OF PATH |
|---|---|
| Web_AP_DISK_domain | 2 |
| DB_DISK_domain | 4 |

FIG.13

NETWORK SUB-DOMAIN DATA
470

| NETWORK SUB-DOMAIN NAME | SWITCH MODEL | SWITCH MANAGEMENT IP |
|---|---|---|
| Web-FRONT | SW1234 | 192.168.1.2 |
|  | SW1234 | 192.168.1.3 |
| Web-BACK | SW1234 | 192.168.1.2 |
|  | SW1234 | 192.168.1.3 |
| AP-FRONT | SW1234 | 192.168.2.4 |
|  | SW1234 | 192.168.2.5 |
| AP-BACK | SW1234 | 192.168.2.2 |
|  | SW1234 | 192.168.2.3 |
| DB-FRONT | SW1234 | 192.168.3.4 |
|  | SW1234 | 192.168.3.5 |

FIG.14

NETWORK DOMAIN DATA
480

| NETWORK DOMAIN NAME | NETWORK SUB-DOMAIN NAME | CONNECTION SYSTEM | DEVICE NAME | BACK NETWORK SUB-DOMAIN NAME | REDUNDANCY SYSTEM |
|---|---|---|---|---|---|
| Internet-Edge | *Internet* | LOAD BALANCER | WEB_LB | Web-Front | NIC SWITCH |
| Web-AP | Web-Back | LOAD BALANCER | AP_LB | AP-Front | HIGH-SPEED SWITCH |
| AP-DB | AP-Back | FIREWALL | DB_FW | DB-Front | NIC SWITCH |

FIG.15

LOAD DISTRIBUTING APPARATUS DATA
490

| LOAD DISTRIBUTING APPARATUS NAME | MANAGEMENT IP | MODEL NAME | SNMP COMMUNITY NAME | ID/PASSWORD |
|---|---|---|---|---|
| Web_LB | 192.168.1.1 | LB_A | public | admin/admin |
| AP_LB | 192.168.2.1 | LB_A | public | admin/admin |

FIG.17

NETWORK SUB-GROUP DATA
660

| NETWORK SUB-GROUP NAME | NETWORK SUB-DOMAIN NAME | SUBNET | SUBNET FOR REDUNCANCY |
|---|---|---|---|
| A_Web-Front | Web-Front | 10.1.1.0/255.255.255.0 | - |
| B_Web-Front | Web-Front | 10.1.1.0/255.255.255.0 | - |
| A_Web-Back | Web-Back | 10.1.3.0/255.255.255.0 | 10.1.11.0/255.255.255.0 <br> 10.1.12.0/255.255.255.0 |
| B_Web-Back | Web-Back | 10.1.4.0/255.255.255.0 | 10.1.13.0/255.255.255.0 <br> 10.1.14.0/255.255.255.0 |
| A_AP-Front | AP-Front | 10.1.5.0/255.255.255.0 | 10.1.15.0/255.255.255.0 <br> 10.1.16.0/255.255.255.0 |
| B_AP-Front | AP-Front | 10.1.6.0/255.255.255.0 | 10.1.17.0/255.255.255.0 <br> 10.1.18.0/255.255.255.0 |
| A_AP-Back | AP-Back | 10.1.7.0/255.255.255.0 | - |
| B_AP-Back | AP-Back | 10.1.8.0/255.255.255.0 | - |
| A_DB-Front | DB-Front | 10.1.9.0/255.255.255.0 | - |
| B_DB-Front | DB-Front | 10.1.10.0/255.255.255.0 | - |

FIG.18

INTER-SERVER-DOMAIN LINK DATA
670

| FRONT SERVER DOMAIN NAME | NETWORK DOMAIN NAME | BACK SERVER DOMAIN NAME |
|---|---|---|
| *Internet* | Internet-Edge | Web_domain |
| Web_domain | Web-AP | AP_domain |
| AP_domain | AP-DB | DB_domain |

INTER-SERVER/STORAGE-DOMAIN LINK DATA
680

| SERVER DOMAIN NAME | STORAGE DOMAIN NAME |
|---|---|
| Web_domain | Web_AP_DISK_domain |
| AP_domain | |
| DB_domain | DB_DISK_domain |

NETWORK BOOT SERVER DATA
690

| MAC ADDRESS | IP ADDRESS | HOST NAME |
|---|---|---|
| 00:00:E2:6F:55:01 | 192.168.1.2 | host1 |
| UNASSIGNED (AUTO) | 192.168.1.3 | host2 |
| UNASSIGNED (AUTO) | 192.168.1.4 | host3 |

FIG.21

MANAGEMENT TARGET SERVER DATA
700

| SERVER NAME | IP ADDRESS | MAC ADDRESS | SERVER ARCHITECTURE NAME | MODEL NAME | SAN BOOT | STATUS |
|---|---|---|---|---|---|---|
| host 1 | 192.168.1.2 | 00:00:E2:6E:55:01 | ARC_A | MODEL_A | O | NORMAL |
| host 2 | 192.168.1.3 | 00:00:E2:6E:55:02 | ARC_A | MODEL_A | O | NORMAL |
| host 3 | 192.168.1.4 | 00:00:E2:6E:55:03 | ARC_A | MODEL_A | O | NORMAL |
| host 4 | 192.168.1.5 | 00:00:E2:6E:55:04 | ARC_A | MODEL_A | O | NORMAL |
| host 5 | 192.168.1.6 | 00:00:E2:6E:55:05 | ARC_A | MODEL_A | O | NORMAL |
| host 6 | 192.168.2.2 | 00:00:E2:6E:55:06 | ARC_B | MODEL_B | O | NORMAL |
| host 7 | 192.168.2.3 | 00:00:E2:6E:55:07 | ARC_B | MODEL_B | O | NORMAL |
| host 8 | 192.168.2.4 | 00:00:E2:6E:55:08 | ARC_B | MODEL_B | O | NORMAL |
| host 9 | 192.168.2.5 | 00:00:E2:6E:55:09 | ARC_B | MODEL_B | O | NORMAL |
| host 10 | 192.168.2.6 | 00:00:E2:6E:55:0A | ARC_B | MODEL_B | O | NORMAL |
| host 11 | 192.168.3.2 | 00:00:E2:6E:55:0B | ARC_C | MODEL_C | O | NORMAL |
| host 12 | 192.168.3.3 | 00:00:E2:6E:55:0C | ARC_C | MODEL_C | O | NORMAL |
| host 13 | 192.168.3.4 | 00:00:E2:6E:55:0D | ARC_C | MODEL_C | O | NORMAL |
| host 14 | 192.168.3.5 | 00:00:E2:6E:55:0E | ARC_C | MODEL_C | O | NORMAL |
| host 15 | 192.168.3.6 | 00:00:E2:6E:55:0F | ARC_C | MODEL_C | O | NORMAL |

FIG.22

PROVISIONING CONFIGURATION DATA
710

| SERVER NAME | POOL GROUP NAME | SERVER GROUP NAME | STORAGE SUB-GROUP NAME | ACCESS-IBILITY |
|---|---|---|---|---|
| host 1 | Web_domain.pool | - | - | - |
| host 2 | Web_domain.pool | - | - | - |
| host 3 | Web_domain.pool | - | - | - |
| host 4 | Web_domain.pool | - | - | - |
| host 5 | Web_domain.pool | - | - | - |
| host 6 | AP_domain.pool | - | - | - |
| host 7 | AP_domain.pool | - | - | - |
| host 8 | AP_domain.pool | - | - | - |
| host 9 | AP_domain.pool | - | - | - |
| host 10 | AP_domain.pool | - | - | - |
| host 11 | DB_domain.pool | - | - | - |
| host 12 | DB_domain.pool | - | - | - |
| host 12 | DB_domain.pool | - | - | - |
| host 14 | DB_domain.pool | - | - | - |
| host 15 | DB_domain.pool | - | - | - |

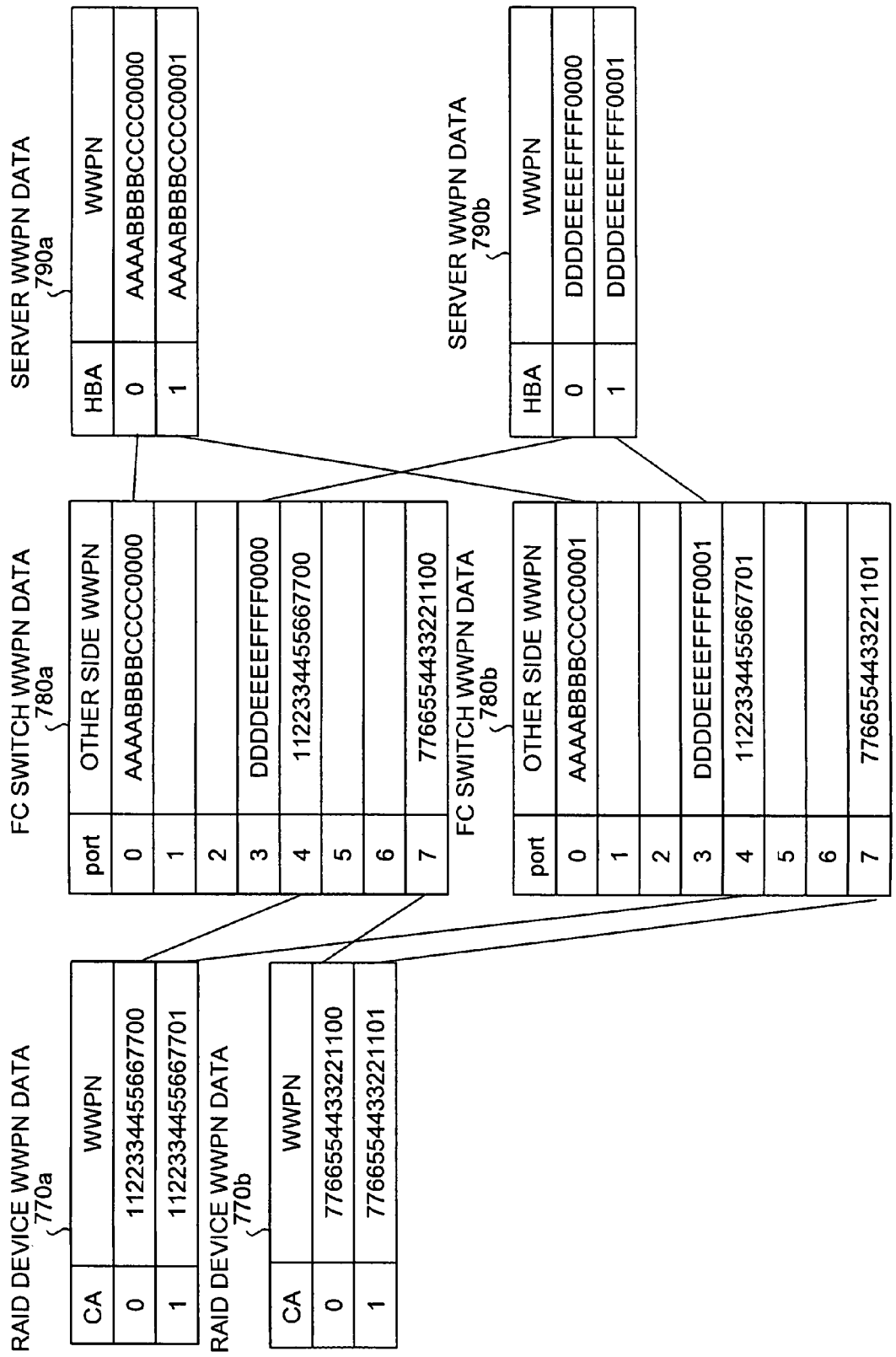

FIG.25

STORAGE TEMPLATE DATA
800

| STORAGE TEMPLATE NAME | DISK TYPE | DISK NAME | RELIABILITY NEED | LOAD LEVEL | DISK CAPACITY | BOOT DISK |
|---|---|---|---|---|---|---|
| A_Web_Str_template | ROOT | disk1 | HIGH | NORMAL | 50 GB | O |
| | LOCAL | disk2 | HIGH | NORMAL | 100 GB | × |
| | LOCAL | disk3 | HIGH | HIGH | 200 GB | × |
| B_Web_Str_template | ROOT | disk1 | HIGH | NORMAL | 50 GB | O |
| | LOCAL | disk2 | HIGH | NORMAL | 50 GB | × |
| | LOCAL | disk3 | HIGH | HIGH | 100 GB | × |
| A_AP_Str_template | ROOT | disk1 | HIGH | NORMAL | 200 GB | O |
| | LOCAL | disk2 | HIGH | HIGH | 200 GB | × |
| B_AP_Str_template | ROOT | disk1 | HIGH | NORMAL | 100 GB | O |
| | LOCAL | disk2 | HIGH | HIGH | 100 GB | × |
| A_DB_Str_template | ROOT | disk1 | HIGH | HIGH | 100 GB | O |
| | LOCAL | disk2 | HIGH | HIGH | 100 GB | × |
| | SHARED | disk3 | HIGH | HIGH | 500 GB | |
| B_DB_Str_template | ROOT | disk1 | HIGH | NORMAL | 100 GB | O |
| | LOCAL | disk2 | HIGH | HIGH | 100 GB | × |
| | SHARED | disk3 | HIGH | HIGH | 250 GB | |
| A_Batch_Str_template | ROOT | disk1 | HIGH | NORMAL | 200 GB | O |

FIG.26

SERVER GROUP DATA
810

| SERVER GROUP NAME | SERVER DOMAIN NAME | SOFTWARE DISTRIBUTION IMAGE NAME | VERSION | STORAGE TEMPLATE NAME | SAN BOOT | AUTO RECOVERY |
|---|---|---|---|---|---|---|
| A_Web | Web_domain | A_OS_Web_image | 1.0 | A_Web_Str_template | ○ | × |
| B_Web | Web_domain n | B_OS_Web_image | 1.1 | B_Web_Str_template | ○ | × |
| A_AP | AP_domain | A_OS_AP_image | 1.3 | A_AP_Str_template | ○ | ○ |
| B_AP | AP_domain | B_OS_AP_image | 1.6 | B_AP_Str_template | ○ | ○ |
| A_DB | DB_domain | C_OS_DB_A_image | 1.0 | A_DB_Str_template | ○ | × |
| B_DB | DB_domain | C_OS_DB_B_image | 1.0 | B_DB_Str_template | ○ | × |
| A_Batch | DB_domain | C_OS_Batch_image | 1.1 | A_Batch_Str_template | ○ | × |

FIG.27

SERVER/STORAGE GROUP LINK DATA
820

| SERVER GROUP NAME | STORAGE GROUP NAME | STORAGE DOMAIN NAME |
|---|---|---|
| A_Web | A_Web_rootdisk | Web_AP_DISK_domain |
| A_Web | A_Web_rootdisk | Web_AP_DISK_domain |
| B_Web | B_Web_rootdisk | Web_AP_DISK_domain |
| B_Web | B_Web_rootdisk | Web_AP_DISK_domain |
| A_AP | A_AP_Web_rootdisk | Web_AP_DISK_domain |
| A_AP | A_AP_Web_rootdisk | Web_AP_DISK_domain |
| B_AP | B_AP_Web_rootdisk | Web_AP_DISK_domain |
| B_AP | B_AP_Web_rootdisk | Web_AP_DISK_domain |
| A_DB | A_DB_rootdisk | DB_DISK_domain |
| A_DB | A_DB_localdisk | DB_DISK_domain |
| A_DB | A_DB_shareddisk | DB_DISK_domain |
| B_DB | B_DB_rootdisk | DB_DISK_domain |
| B_DB | B_DB_localdisk | DB_DISK_domain |
| B_DB | B_DB_shareddisk | DB_DISK_domain |
| A_Batch | A_Batch_rootdisk | |

FIG.28

INTER-SERVER-GROUP LINK DATA
830

| FRONT SERVER GROUP NAME | NETWORK GROUP NAME | BACK SERVER GROUP NAME |
|---|---|---|
| *Internet* | A_Internet-Edge | A_Web |
| *Internet* | B_Internet-Edge | B_Web |
| A_Web | A_Web-AP | A_AP |
| B_Web | B_Web-AP | B_AP |
| A_AP | A_AP-DB | A_DB |
| B_AP | B_AP-DB | B_DB |

FIG.29

LOAD DISTRIBUTION GROUP DATA
840

| LOAD DISTRIBUTION GROUP NAME | LOAD BALANCER NAME | REPRESENTATIVE IP |
|---|---|---|
| A_Web_LB | Web_LB | 10.0.1.1 |
| B_Web_LB | Web_LB | 10.0.1.2 |
| A_AP_LB | AP_LB | 10.1.3.1 |
| B_AP_LB | AP_LB | 10.1.4.1 |

FIG.30

NETWORK GROUP DATA
850

| NETWORK GROUP NAME | NETWORK DOMAIN NAME | FRONT NETWORK SUB-GROUP NAME | LOAD DISTRIBUTION GROUP NAME | BACK NETWORK SUB-GROUP NAME |
|---|---|---|---|---|
| A_Internet-Edge | Internet-Edge | *Internet* | A_Web-LB | A_Web-Front |
| B_Internet-Edge | Internet-Edge | *Internet* | B_Web-LB | B_Web-Front |
| A_Web_AP | Web_AP | A_Web-Back | A_AP-LB | A_AP-Front |
| B_Web_AP | Web_AP | B_Web-Back | B_AP-LB | B_AP-Front |
| A_AP_DB | AP_DB | A_AP-Back | - | A_DB-Front |
| B_AP_DB | AP_DB | B_AP-Back | - | B_DB-Front |

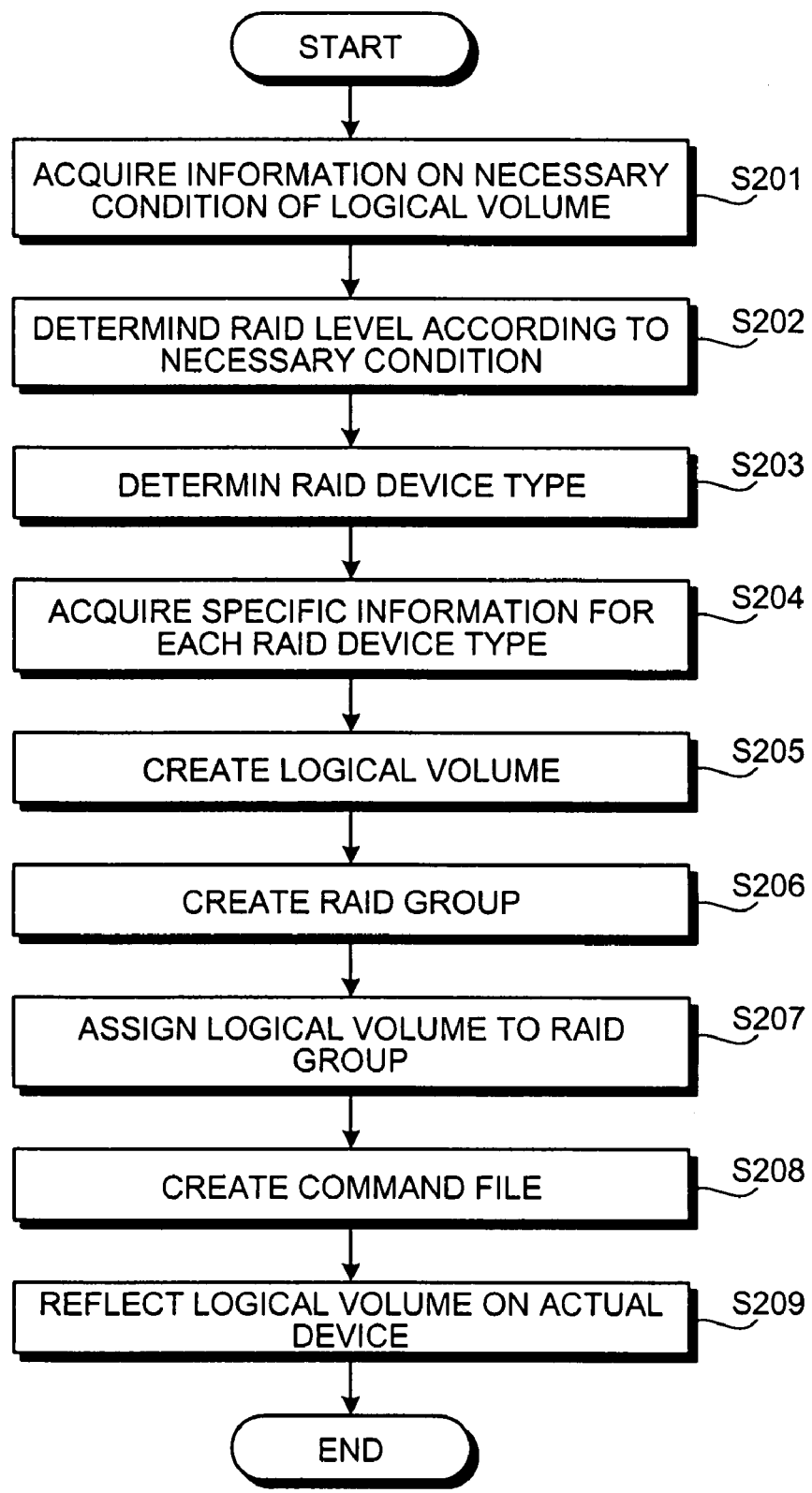

RAID-LEVEL SETTING DATA
940

| RELIABILITY NEED | LOAD LEVEL | RAID LEVEL |
|---|---|---|
| HIGH | HIGH | RAID0+1 |
| HIGH | STANDARD | RAID0+1 |
| HIGH | LOW | RAID5 |
| STANDARD | HIGH | RAID0+1 |
| STANDARD | STANDARD | RAID0+1 |
| STANDARD | LOW | RAID5 |
| LOW | HIGH | RAID0+1 |
| LOW | STANDARD | RAID0+1 |
| LOW | LOW | RAID5 |

FIG.34

RAID DEVICE DATA 950

| TOTAL REQUIRED STORAGE CAPACITY (GB) | RAID DEVICE MODEL | DATA ACCESS SPEED (ORDER OF SPEED) | | | NUMBER OF DISK DRIVES CONFIGURING RAID GROUP (FOR RAID0+1) | NUMBER OF DISK DRIVES CONFIGURING RAID GROUP (FOR RAID5) | MAXIMUM NUMBER OF RAID GROUPS |
|---|---|---|---|---|---|---|---|
| | | FIRST | SECOND | THIRD | | | |
| 0 TO 99 | RAID-Model1 | 18 GB/15 Krpm | 18 GB/10 Krpm | 36 GB/10 Krpm | 4 | 5 | 4 |
| 100 TO 499 | RAID-Model2 | 18 GB/15 Krpm | 18 GB/10 Krpm | 72 GB/10 Krpm | 4 | 5 | 5 |
| 500 TO 999 | RAID-Model3 | 18 GB/15 Krpm | 18 GB/10 Krpm | 144 GB/10 Krpm | 4 | 5 | 6 |

FIG.35

PROVISIONING CONFIGURATION DATA
960

| SERVER NAME | POOL GROUP NAME | SERVER GROUP NAME | STORAGE SUB-GROUP NAME | ACCESS-IBILITY |
|---|---|---|---|---|
| host1 | - | A_Web | A_Web_rootdisk_host1 | O |
|  |  |  | A_Web_localdisk_host1 | O |
| host 2 | - | A_Web | A_Web_rootdisk_host2 | O |
|  |  |  | A_Web_localdisk_host2 | O |
| host 3 | - | B_Web | B_Web_rootdisk_host3 | O |
|  |  |  | A_Web_localdisk_host3 | O |
| host 4 | - | B_Web | B_Web_rootdisk_host4 | O |
|  |  |  | A_Web_localdisk_host4 | O |
| host 5 | Web_domain.pool | - | A_Web_rootdisk_host5 | × |
|  |  |  | A_Web_localdisk_host5 | × |
|  |  |  | B_Web_rootdisk_host5 | × |
|  |  |  | B_Web_localdisk_host5 | × |
| host 6 | - | A_AP | A_AP_rootdisk_host6 | O |
|  |  |  | A_AP_localdisk_host6 | O |
| host 7 | - | A_AP | A_AP_rootdisk_host7 | O |
|  |  |  | A_AP_localdisk_ho st7 | O |
| host 8 | - | B_AP | B_AP_rootdisk_host8 | O |
|  |  |  | B_AP_localdisk_host8 | O |
| host 9 | - | B_AP | B_AP_rootdisk_host9 | O |
|  |  |  | B_AP_localdisk_host9 | O |
| host10 | AP_domain.pool | - | - | - |
| host 11 | - | A_DB | A_DB_rootdisk_host11 | O |
|  |  |  | A_DB_localdisk_host11 | O |
|  |  |  | A_Batch_rootdisk_host11 | × |
| h ost 12 | - | A_DB | A_DB_rootdisk_host12 | O |
|  |  |  | A_DB_localdisk_host12 | O |
|  |  |  | A_Batch_rootdisk_host12 | × |
| h ost 13 | - | B_DB | B_DB_rootdisk_host13 | O |
|  |  |  | B_DB_localdisk_host13 | O |
| host 14 | - | B_DB | B_DB_rootdisk_host14 | O |
|  |  |  | B_DB_localdisk_host14 | O |
| host15 | B_DB_domain.pool | - | - | - |

AFFINITY GROUP DATA
1010

| RAID DEVICE NAME | AFFINITY GROUP NAME | LUN | LV |
|---|---|---|---|
| α | AG0 | 0 | 0 |
| | | 1 | 1 |
| | AG1 | 0 | 0 |
| | | 1 | 1 |
| β | AG10 | 2 | 12 |
| | | 3 | 13 |
| | AG11 | 2 | 12 |
| | | 3 | 13 |

MULTIPATH CONFIGURATION DATA
1020

| MULTIPATH INSTANCE NAME | LUN |
|---|---|
| mplb0 | 0 |
| mplb1 | 1 |
| mplb2 | 2 |
| mplb3 | 3 |

MIRROR VOLUME CONFIGURATION DATA
1030

| MIRROR VOLUME NAME | CONFIGURING DISK NAME |
|---|---|
| M0 | mplb0,mplb2 |
| M1 | mplb1,mplb3 |

IP ADDRESS MANAGEMENT DATA
1040

| IP ADDRESS | ASSIGNMENT DESTINATION |
|---|---|
| 10.1.1.1 | host 1 |
| 10.1.1.2 | host 2 |
| 10.1.1.3-250 | FOR AUTO REGISTRATION |
| 10.1.1.251-254 | DEVICE OUT OF MANAGEMENT |

FIG.42

SOFTWARE IMAGE MANAGEMENT DATA
1050

| SOFTWARE IMAGE NAME | FORMAT | OS PROPERTY | SOFTWARE NAME |
|---|---|---|---|
| A_OS | ARCHIVE FORMAT | y | A_OS RHAS 3.0 |
| B_OS Server | ARCHIVE FORMAT | y | B_OS Server |
| C_OS 8 | ARCHIVE FORMAT | y | C_OS 8 |
| C_OS 9 | ARCHIVE FORMAT | y | C_OS 9 |
| A_Software_L | ARCHIVE FORMAT | n | A_Software for A_OS |
| A_Software_W | ARCHIVE FORMAT | n | A_Software for B_OS |
| MW_A_L | ARCHIVE FORMAT | n | MW_A V7 for A_OS |
| MW_A_W | ARCHIVE FORMAT | n | MW_A V7 for B_OS |
| B_Software | ARCHIVE FORMAT | n | B_Software |
| patch_a | PATCH FORMAT | n | T912345LP-01 |

FIG.43

SOFTWARE DISTRIBUTION IMAGE MANAGEMENT DATA
1060

| SOFTWARE DISTRIBUTION IMAGE NAME | VERSION | SERVER ARCHITECTURE NAME | SOFTWARE IMAGE/SNAPSHOT NAME |
|---|---|---|---|
| A_OS_Web_image | 1.0 | ARC_A<br>ARC_B | apimg_snap_1 |
| A_OS_Web_image | 1.1 | ARC_A<br>ARC_B | apimg_snap_1<br>patch_a |
| B_OS_Web_image | 1.1 | ARC_A | B_OS Server<br>A_Software_W |
| A_OS_AP_image | 1.2 | ARC_A<br>ARC_B | A_OS<br>MW_A_L |
| A_OS_AP_image | 1.3 | ARC_A<br>ARC_B | A_OS<br>MW_A_L<br>patch_a |
| B_OS_AP_image | 1.6 | ARC_A | B_OS Server<br>MW_A_W |
| C_OS_DB_A_image | 1.0 | ARC_C | C_OS 9<br>A_Software |
| C_OS_DB_B_image | 1.0 | ARC_C | C_OS 8<br>B_Software |
| C_OS_Batch_image | 1.1 | ARC_C | C_OS 9 |

FIG.44

SNAPSHOT MANAGEMENT DATA
1070

| SNAPSHOT NAME | SOFTWARE IMAGE NAME |
|---|---|
| apimg_snap_1 | A_OS<br>A_Software_L<br>patch_a |

FIG.46

DISTRIBUTION MANAGEMENT DATA
1080

| SERVER NAME | STORAGE SUB-GROUP NAME | SOFTWARE DISTRIBUTION IMAGE NAME | VERSION | STATUS |
|---|---|---|---|---|
| host1 | A_Web_rootdisk_host1 | A_OS_Web_image | 1.0 | COMPLETE |
| host2 | A_Web_rootdisk_host2 | A_OS_Web_image | 1.0 | DISTRIBUTING··· |
| host3 | A_Web_rootdisk_host3 | B_OS_Web_image | 1.1 | FAILED |
| host4 | A_Web_rootdisk_host4 | B_OS_Web_image | 1.1 | COMPLETE |
| host5 | A_Web_rootdisk_host5 | A_OS_Web_image | 1.0 | COMPLETE |
| | B_Web_rootdisk_host5 | B_OS_Web_image | 1.1 | COMPLETE |
| host6 | A_AP_rootdisk_host6 | A_OS_AP_image | 1.3 | COMPLETE |
| host7 | A_AP_rootdisk_host7 | A_OS_AP_image | 1.3 | COMPLETE |
| host8 | B_AP_rootdisk_host8 | B_OS_AP_image | 1.6 | COMPLETE |
| host9 | B_AP_rootdisk_host9 | B_OS_AP_image | 1.6 | COMPLETE |
| host10 | - | - | - | - |
| host11 | A_DB_rootdisk_host11 | C_OS_DB_A_image | 1.0 | COMPLETE |
| | A_Batch_rootdisk_host11 | C_OS_Batch_A_image | 1.1 | COMPLETE |
| host12 | A_DB_rootdisk_host12 | C_OS_DB_A_image | 1.0 | COMPLETE |
| | A_Batch_rootdisk_host12 | C_OS_Batch_A_image | 1.1 | COMPLETE |
| host13 | B_DB_rootdisk_host13 | C_OS_DB_B_image | 1.0 | COMPLETE |
| host14 | B_DB_rootdisk_host14 | C_OS_DB_B_image | 1.0 | COMPLETE |
| host15 | - | - | - | - |

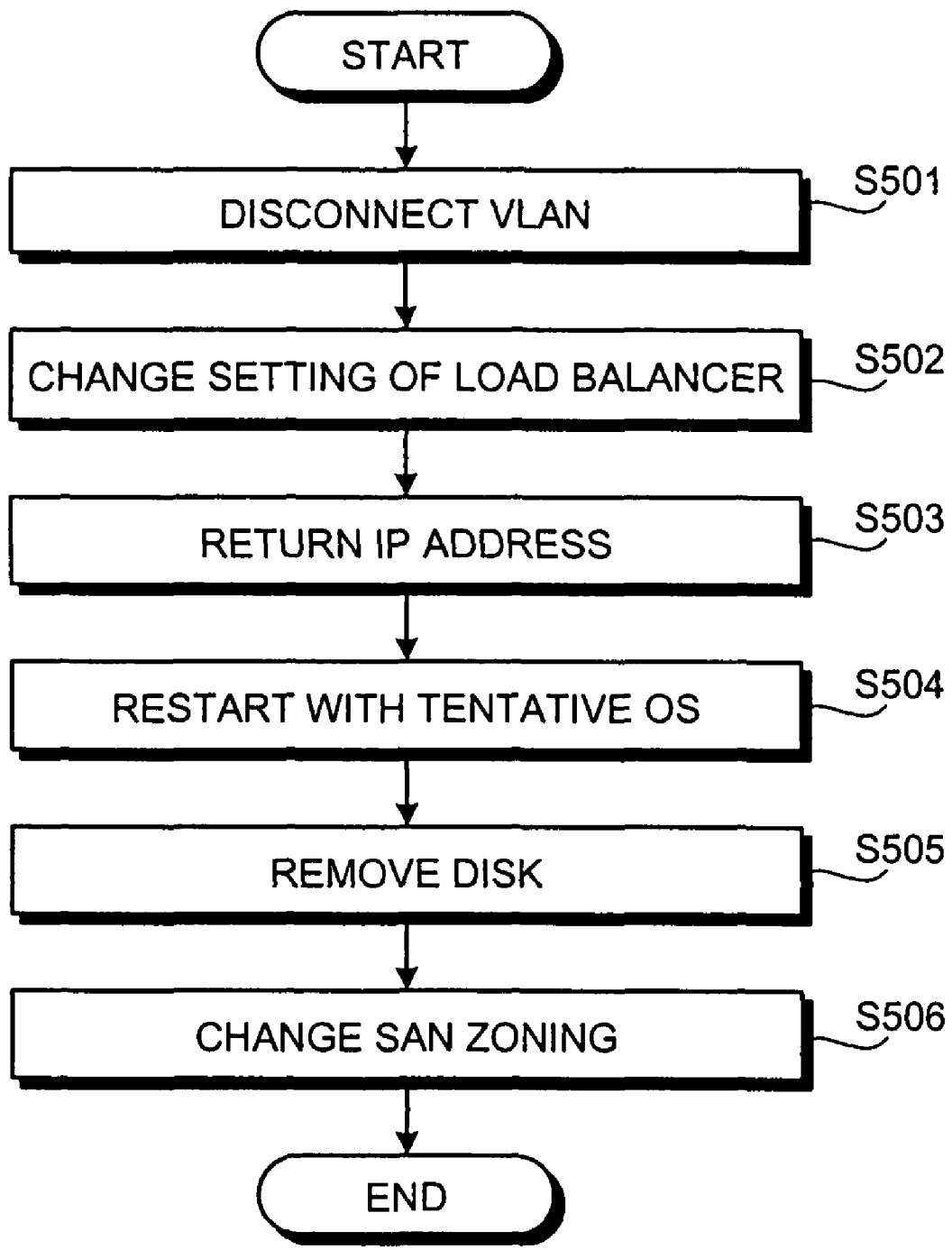

FIG.48 RESOURCE LAYOUT OUTPUT SCREEN 1090
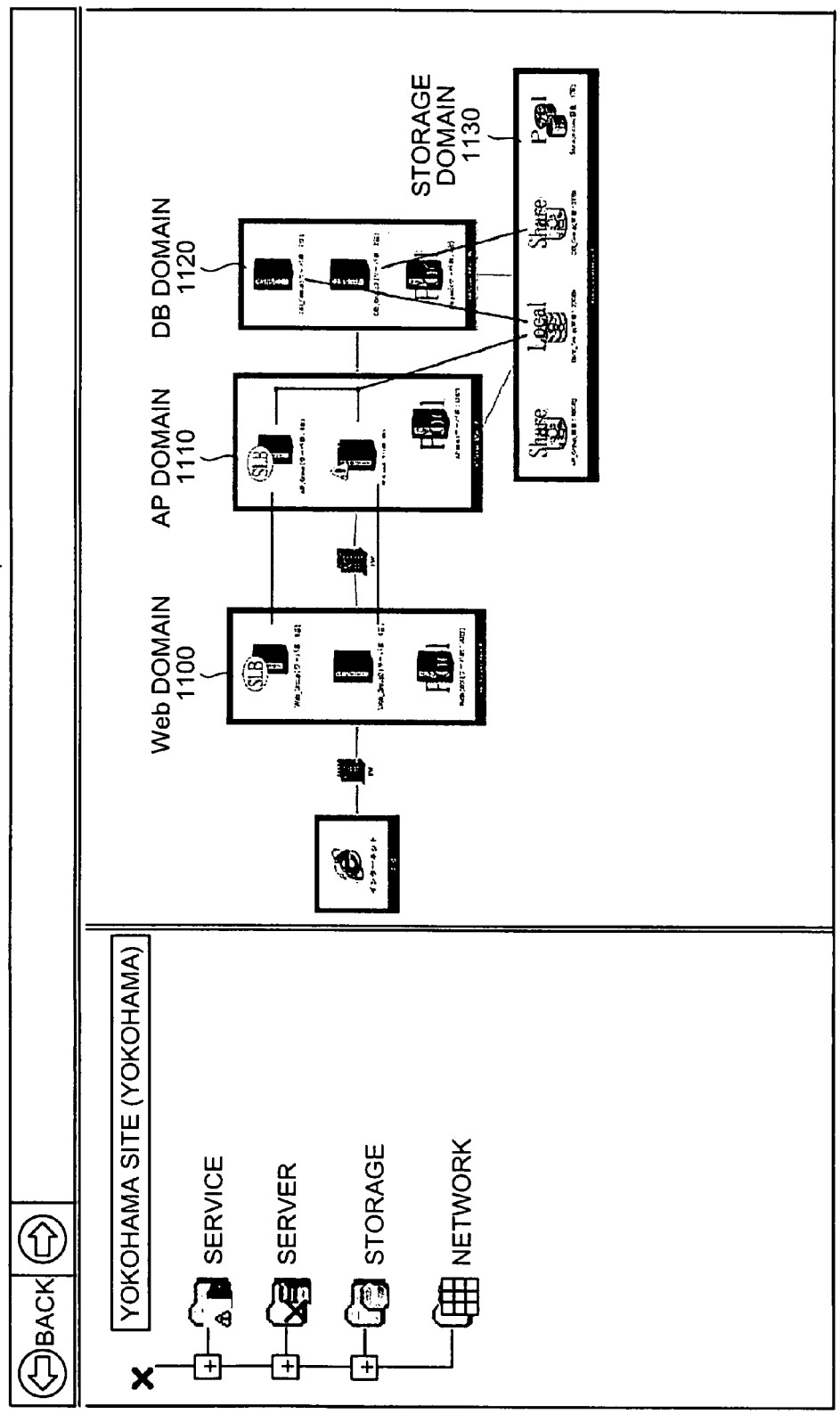

FIG.50 SERVER GROUP LIST SCREEN

SERVER LIST SCREEN

FIG.52 STORAGE LIST SCREEN 1170

SWITCHING CONNECTION OF A BOOT DISK TO A SUBSTITUTE SERVER AND MOVING THE FAILED SERVER TO A SERVER DOMAIN POOL This is a continuation filed under 35 U.S.C. §111(a), of International Application No. PCT/JP2004/015383, filed Oct. 18, 2004.

BACKGROUND OF THE INVENTION

1. Field of the Invention

The present invention relates to a technology for managing an operation of a plurality of servers that is booted up using a boot disk on a SAN, with a capability of performing a recovery from a failure of an operating server efficiently without fault.

2. Description of the Related Art

Conventionally, a technique for making, when a failure occurs in a server constituting an information processing system and a service is continuously provided using a substitute server, work for replacement with the substitute server efficient has been developed.

For example, a technique for automatically establishing, when a failed server is replaced with a substitute server, an environment in which the substitute server can use data of a disk used by the failed server has been developed (see, for example, Japanese Patent Application Laid-Open No. 2000-99359).

However, in an information processing system in which a plurality of servers connected to a LAN (Local Area Network or a SAN (Storage Area Network) provide a plurality of services, other than allowing the substitute server to use the data of the disk, it is necessary to make a physical wire connection with the LAN or the SAN identical with that of a failed server and inherit resources such as a network and a storage from the failed server. Thus, there is a problem in that it is difficult to switch the failed server to the substitute server.

It is also necessary to establish, on the substitute server, a software environment required for providing services covered by the failed server. Thus, there is a problem in that it is extremely difficult to surely establish, on the substitute server, a software environment constituted by a large number of kinds of software having a plurality of versions.

SUMMARY OF THE INVENTION

It is an object of the present invention to at least partially solve the problems in the conventional technology.

A computer-readable recording medium according to one aspect of the present invention stores therein a computer program for managing an operation of a plurality of servers that is booted up using a boot disk on a storage area network. The computer program causes a computer to execute switching, when a failure occurs in any one of operating servers from among the servers, a connection of the boot disk on the storage area network from a failed server to a substitute server; and booting the substitute server using the boot disk on the storage area network of which the connection is switched to the substitute server at the switching.

A method according to another aspect of the present invention is for managing an operation of a plurality of servers that is booted up using a boot disk on a storage area network. The method includes switching, when a failure occurs in any one of operating servers from among the servers, a connection of the boot disk on the storage area network from a failed server to a substitute server; and booting the substitute server using the boot disk on the storage area network of which the connection is switched to the substitute server at the switching.

An apparatus according to still another aspect of the present invention is for managing an operation of a plurality of servers that is booted up using a boot disk on a storage area network. The apparatus includes a boot-disk switching unit that switches, when a failure occurs in any one of operating servers from among the servers, a connection of the boot disk on the storage area network from a failed server to a substitute server; and a substitute-server booting unit that boots up the substitute server using the boot disk on the storage area network of which the connection is switched to the substitute server by the boot-disk switching unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table of an example of site data in which information on an operation management server is registered;

FIG. 6 is a table of an example of domain management server data in which information on a domain management server is registered;

FIG. 7 is a table of an example of management sub-network data in which information on sub-networks as management targets is registered;

FIG. 8 is a table of an example of middleware cooperation IF data that stores commands for executing various kinds of processing in cooperation with middleware;

FIG. 9 is a table of an example of server domain data that stores information on server domains as domains to which servers belong;

FIG. 10 is a table of an example of pool group data that stores information on pool groups;

FIG. 11 is a table of an example of storage domain data that stores information on storage domains;

FIG. 13 is a table of an example of network sub-domain data that stores information on network sub-domains;

FIG. 14 is a table of an example of network domain data that stores information on network domains;

FIG. 15 is a table of an example of load distributing apparatus data that stores information on load distributing apparatuses;

FIG. 17 is a table of an example of network sub-group data that stores information on network sub-groups;

FIG. 18 is a table of an example of inter-server-domain link data that stores information on a correspondence relation among server domains;

FIG. 21 is a table of an example of management target server data that stores data on servers as management targets;

FIG. 22 is a table of an example of provisioning configuration data that stores information on groups to which servers belong;

FIG. 24 is a diagram for explaining processing for checking uniformity of the connection based on a WWPN;

FIG. 25 is a table of an example of storage template data that stores data concerning storage templates;

FIG. 26 is a table of an example of server group data that stores information on server groups;

FIG. 27 is a table of an example of server/storage group link data that stores storage groups corresponding to server groups;

FIG. 28 is a table of an example of inter-server-group link data that stores information on a correspondence relation among server groups;

FIG. 29 is a table of an example of load distribution group data that stores group information on load distributing apparatuses;

FIG. 30 is a table of an example of network group data that stores information on network groups;

FIG. 31 is a flowchart for explaining a processing procedure of processing for setting logical volumes in RAID devices;

FIG. 34 is a table of an example of RAID device data that stores information on RAID devices;

FIG. 35 is a table of an example of provisioning configuration data in which storage sub-groups are set;

FIG. 42 is a table of an example of software image management data that stores information on software images;

FIG. 43 is a table of an example of software distribution image management data that stores information on software distribution images;

FIG. 44 is a table of an example of snapshot management data that stores information on snapshots;

FIG. 46 is a diagram of an example of distribution management data that stores information on a distribution state of software distribution images;

FIG. 47 is a flowchart for explaining a processing procedure of server deletion processing for deleting a server from a server group;

FIG. 48 is a diagram of an example of a resource-arrangement output screen showing an arrangement of resources as management targets;

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
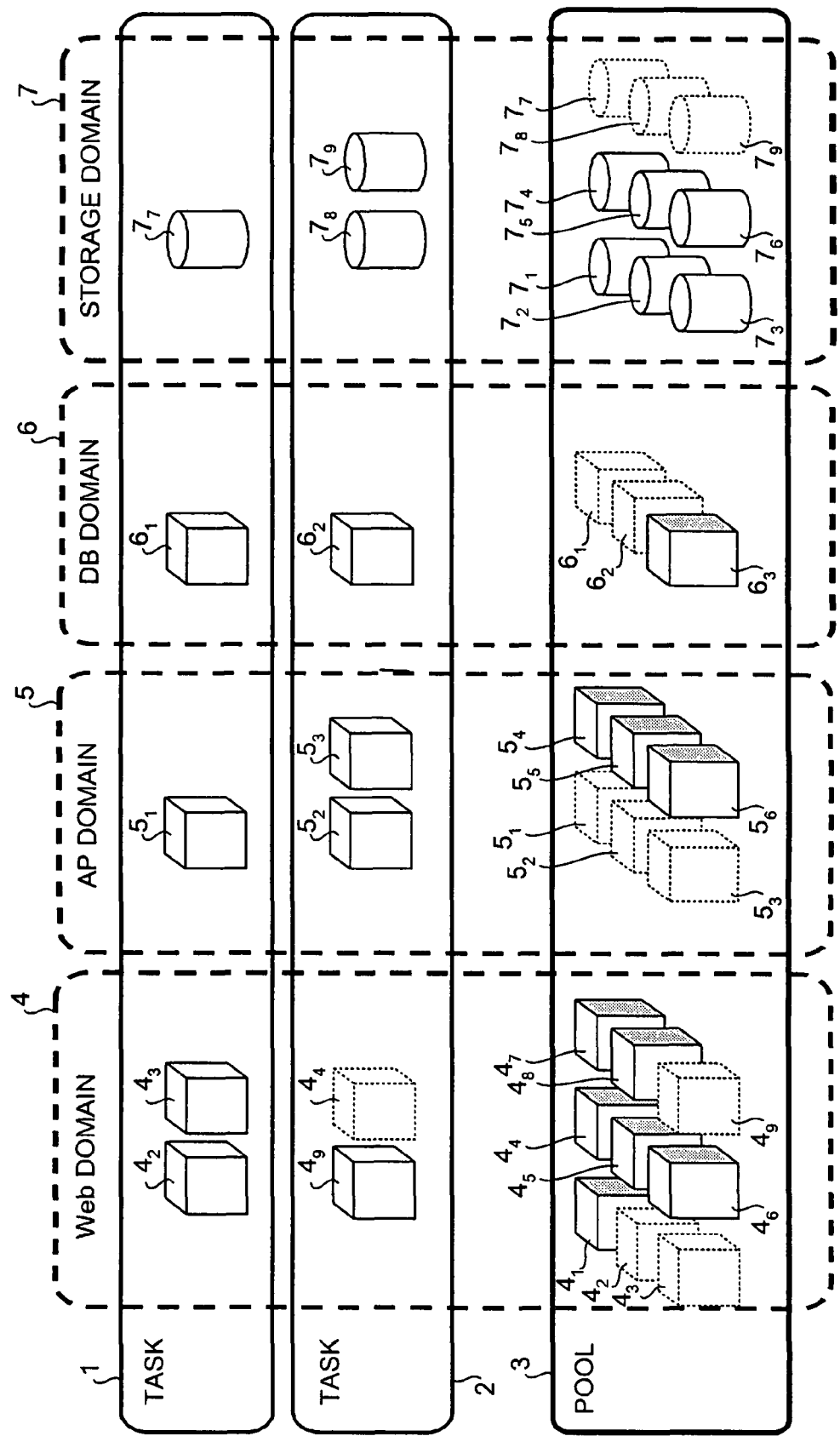
FIG. 1 is a diagram for explaining a concept of a domain in an operation management program according to an embodiment of the present invention.
Figure 2:
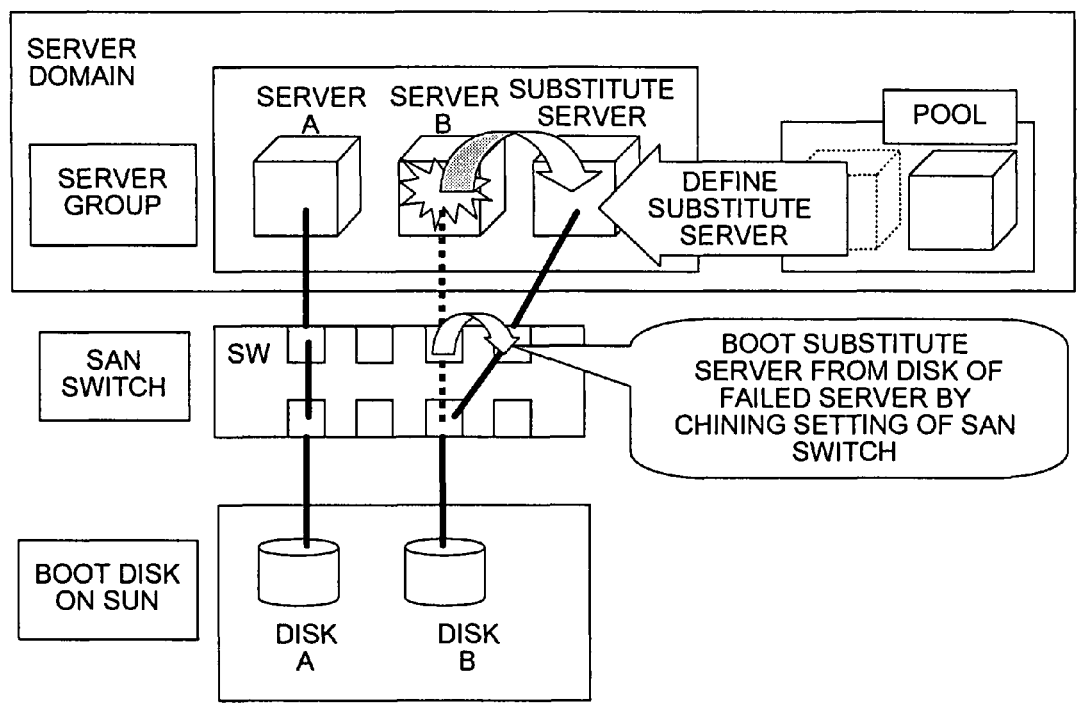
FIG. 2 is a diagram for explaining a concept of automatic recovery based on a domain.

First, a concept of automatic recovery by an operation management program according to an embodiment of the present invention is explained using FIGS. 1 and 2. FIG. 1 is a diagram for explaining a concept of a domain in the operation management program according to the embodiment. FIG. 2 is a diagram for explaining a concept of automatic recovery based on domains.

In FIG. 1, a case is depicted in which information processing apparatuses such as web servers $4_1$ to $4_9$, AP (application) servers $5_1$ to $5_6$, DB (database) servers $6_1$ to $6_3$, and storages $7_1$ to $7_9$ are used for each of tasks 1 and 2.

The web servers $4_1$ to $4_9$ are servers that provide contents to be browsed by web browsers to client terminals via the Internet. The AP servers $5_1$ to $5_6$ are servers that take over execution of information processes requested by the web servers $4_1$ to $4_9$ that have received an information processing request from a user.

The DB servers $6_1$ to $6_3$ are servers that manage accesses to database upon receiving requests for accessing the database from the AP servers $5_1$ to $5_6$. The storages $7_1$ to $7_9$ are storage devices to be connected via a SAN to the web servers $4_1$ to $4_9$, the AP servers $5_1$ to $5_6$, and the DB servers $6_1$ to $6_3$.

With operation management according to the present invention, a resource group that contains servers or storages having a uniform physical wire connection to other devices is managed as a domain in a LAN or a SAN.

For example, in the case shown in FIG. 1, server groups used for the tasks 1 and 2 are managed as a web domain 4, an AP domain 5, and a DB domain 6, while a storage group used for the tasks 1 and 2 is managed as a storage domain 7.

In this case, the web servers $4_1$ to $4_9$ that belong to the web domain 4 have uniform connections to other devices, the AP servers $5_1$ to $5_6$ that belong to the AP domain 5 have uniform connections to other devices, the DB servers $6_1$ to $6_3$ that belong to the DB domain 6 have uniform connections to other devices, and the storages $7_1$ to $7_9$ that belong to the storage domain 7 have uniform connections to other devices.

With the operation management, unused ones of the web servers $4_1$ to $4_9$, the AP servers $5_1$ to $5_6$, the DB servers $6_1$ to $6_3$, and the storages $7_1$ to $7_9$ are registered to a pool 3 for each domain. The web servers $4_1$ to $4_9$, the AP servers $5_1$ to $5_6$, the DB servers $6_1$ to $6_3$, and the storages $7_1$ to $7_9$ are assigned to each of the tasks 1 and 2 as appropriate.

For example, in the example of FIG. 1, the web servers $4_2$ and $4_3$, the AP server $5_1$, the DB server $6_1$, and the storage $7_7$ are assigned to the task 1, while the web server $4_9$, the AP servers $5_2$ and $5_3$, the DB server $6_2$, and the storages $7_8$ and $7_9$ are assigned to the task 2.

The servers assigned to the specific jobs in the respective domains constitute server groups in the respective domains. For example, the Web servers $4_2$ and $4_3$ assigned to the job 1 constitute a server group in the Web domain 4 and the Web server $4_9$ assigned to the job 2 constitutes another server group in the Web domain 4.

As shown in FIG. 2, when a failure occurs in a server B, which is a server of a certain group, the operation management program according to the embodiment selects a substitute server from a pool of a server domain to which the server group belongs, switches a disk B, which is a boot disk on a SAN connected to the server B, to the substitute server using a SAN switch, and boots up the substitute server on the SAN using the disk B.

It is guaranteed in advance that the substitute server selected from the pool of the server domain to which the failed server B belongs has uniform physical wire connections with a LAN and a SAN. Therefore, it is unnecessary to perform physical wire connection at the time of switching to the substitute server and it is possible to efficiently and surely perform switching to the substitute server.

The operation management program according to the embodiment manages, for each server group, information on storages accessed by servers and a network to which the servers are connected. Therefore, in switching a failed server belonging to a certain server group to the substitute server, it is possible to automatically perform switching of the access to the storage and the network connection.

In this way, the operation management program according to the embodiment selects, when a failure occurs in a server, a substitute server from a pool of a server domain to which the failed server belongs, switches a boot disk on the SAN connected to the failed server to the substitute server using the SAN switch, and boots up the substitute server on the SAN. This makes it possible to surely inherit network resources and storage resources from the failed server and efficiently perform automatic recovery.

Figure 3:
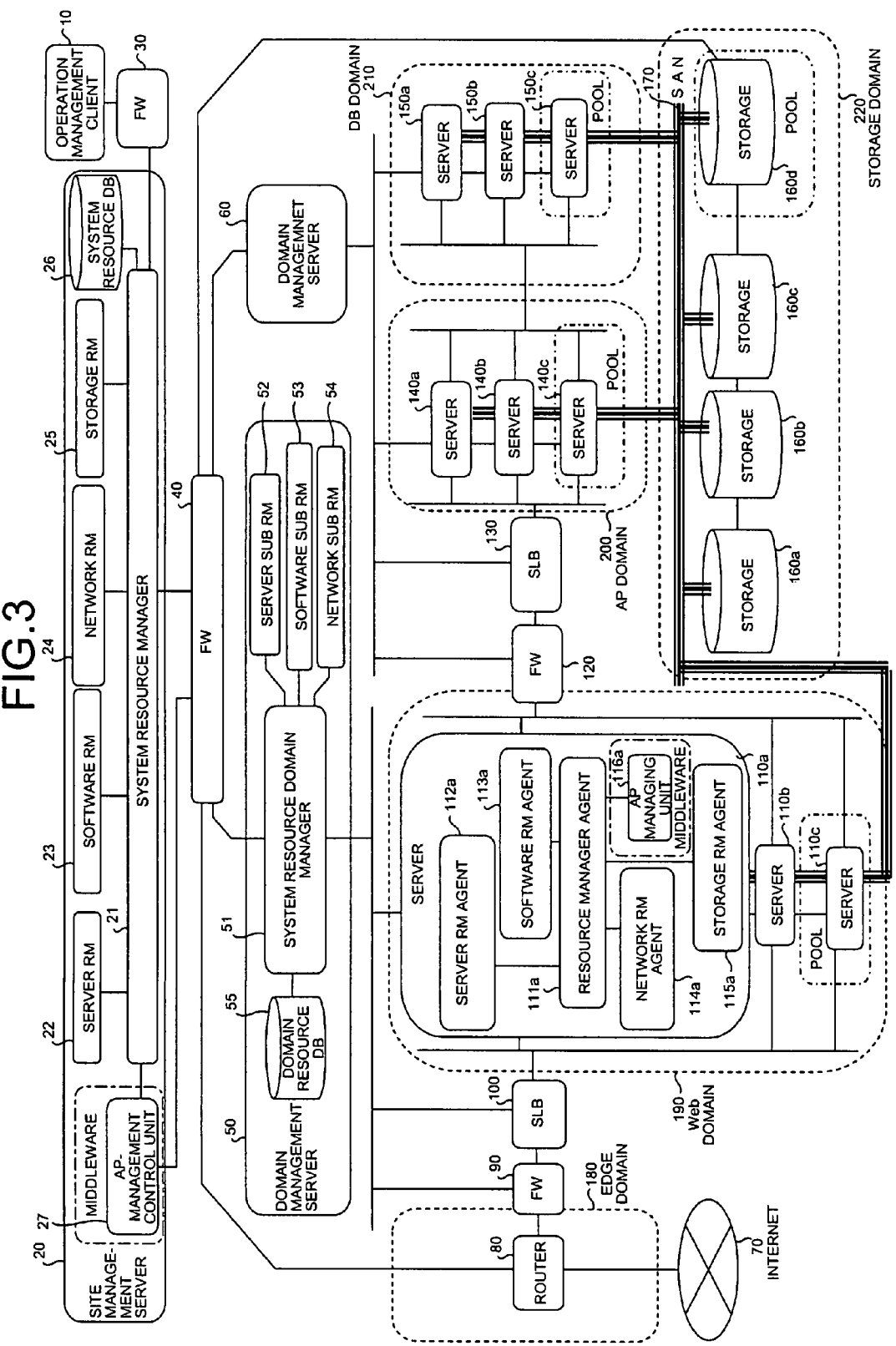
FIG. 3 is a diagram of a functional structure of an operation management system according to the embodiment.

A functional configuration of an operation management system according to the embodiment is explained below. FIG. 3 is a diagram of a functional configuration of the operation management system according to the embodiment.

As shown in FIG. 3, in the operation management system, an operation management client 10 is connected to a site management server 20 via an FW (firewall) 30 over a network. The site management server 20 is connected over the network to domain management servers 50 and 60 via an FW 40.

Furthermore, the site management server 20 is connected over the network to a router 80 that belongs to an edge domain 180 via the FW 40. The site management server 20 is also connected over the network to storages 160a to 160c that belong to a storage domain 220, and to a storage 160d that is pooled via the FW 40.

The domain management server 50 is connected over the network to an SLB (server load balancer) 100 and to servers 110a to 110c that belong to a web domain 190.

Furthermore, the domain management server 60 is connected over the network to an FW 120, an SLB 130, servers 140a to 140c that belong to an AP domain 200, servers 150a to 150c that belong to a DB domain 210.

The storages 160a to 160c that belong to the storage domain 220, and the storage 160d that is pooled are also connected via a SAN 170 to the servers 110a to 110c that belong to the web domain 190, the servers 140a to 140c that belong to the AP domain 200, and the servers 150a to 150c that belong to the DB domain 210.

The operation management client 10 is a client apparatus that receives various settings concerning resource allocation management processing from the user, transmits the setting information to the site management server 20 and receives various output results from the site management server 20, and displays the output results on a monitor and the like.

The site management server 20 is a server apparatus that executes the operation management explained with reference to FIG. 1 in cooperation with the domain management servers 50 and 60. The site management server 20 has functional units, namely, a system resource manager 21, a server RM (Resource Manager) 22, a software RM 23, a network RM 24, a storage RM 25, a system resource DB 26, and an AP (Application)-management control unit 27.

The system resource manager 21 is a managing unit that receives various setting information related to the operation management from the operation management client 10, and operates resources in cooperation with the server RM 22, the software RM 23, the network RM 24, and the storage RM 25. In addition, the system resource manager 21 performs data reception and data transmission between the domain management servers 50 and 60.

The server RM 22 is a managing unit that performs boot and stop, collection of information on hardware, setting, and the like for of the servers 110a to 110c, 140a to 140c, and 150a to 150c. The server RM 22 executes the above processing in cooperation with a server sub RM 52 of the domain management server 50 and a server RM agent 112a of the server 110a.

The software RM 23 is a managing unit that performs installation of software, setting, collection of information on the software, and the like for the servers 110a to 110c, 140a to 140c, and 150a to 150c. The software RM 23 executes the above processing in cooperation with a software sub RM 53 of the domain management server 50 and a software RM agent 113a of the server 110a.

The network RM 24 is a managing unit that performs information collection, setting, and the like related to the network. The network RM 24 performs the above processes in cooperation with a network sub RM 54 of the domain management server 50, and a network RM agent 114a of the server 110a.

The storage RM 25 is a managing unit that performs information collection, setting, and the like related to the storages 160a to 160c that belong to the storage domain 220, and relate to the storage 160d that is pooled. The storage RM 25 manages the storages 160a to 160c and the storage 160d pooled without involving the domain management servers 50 and 60.

The system resource DB 26 is a database that contains various resource information managed by the system resource manager 21, the server RM 22, the software RM 23, the network RM 24, and the storage RM 25. Details of stored data are explained later.

The AP-management control unit 27 is a processing unit that controls and manages an AP (application) managing unit 116a. More specifically, the AP-management control unit 27 sends a request for executing process related to an application such as installation and setting to the AP managing unit 116a. Functions of the AP-management control unit 27 are realized by executing middleware installed on the site management server 20.

The domain management servers 50 and 60 are servers that manage resources in a domain or a plurality of domains. The domain management server 50 includes a system resource domain manager 51, the server sub RM 52, the software sub RM 53, the network sub RM 54, and a domain resource DB 55.

The domain management server 60 includes the same function units as the function units of the domain management server 50, and therefore, the function units of the domain management server 60 are not shown in FIG. 3 and explanations thereof are omitted.

The system resource domain manager 51 is a managing unit that performs information collection, setting process, and the like related to resources that belong to each of the domains in cooperation with the server sub RM 52, the software sub RM 53, and the network sub RM 54.

Furthermore, the system resource domain manager 51 performs data reception and data transmission to and from networking equipment such as the site management server 20, an FW 90, and the SLB 100, as well as to and from the servers 110a to 110c to be managed.

The server sub RM 52 is a managing unit that performs boot, shutdown, collection of information about hardware, setting, and the like in cooperation with the server RM 22 and the server RM agent 112a.

The software sub RM 53 is a managing unit that performs software installation, setting, collection of information about software, and the like for each of the servers 110a to 110c in cooperation with the software RM 23 and the software RM agent 113a.

The network sub RM 54 is a managing unit that performs information collection, setting, and the like related to a network in cooperation with the network RM 24 and the network RM agent 114a.

The domain resource DB 55 is a database that stores therein information acquired from the servers 110a to 110c and the system resource DB 26, when the server sub RM 52, the software sub RM 53, or the network sub RM 54 collects various information or specifies settings related to the servers 110a to 110c to be managed. In addition, the domain resource DB 55 stores therein a virtual OS (operating system) used for network boot of the servers 110a to 110c.

The router 80 is networking equipment that performs routing of data packets in data communication via the Internet 70. The FWs 30, 40, 90, and 120 are networking equipments that prevent unauthorized access to each of the servers 110a to 110c, 140a to 140c, and 150a to 150c.

The SLBs 100 and 130 are load balancers that distribute and transfer information-processing requests for the servers 110a to 110c or 140a to 140c to a plurality of the servers 110a to 110c or 140a to 140c. Although switches are also connected in upstream sides and downstream sides of the SLBs 100 and 130, the switches are not shown in FIG. 3.

The servers 110a to 110c, 140a to 140c, and 150a to 150c are servers that perform various information processes. The server 110a includes a resource manager agent 111a, the server RM agent 112a, the software RM agent 113a, the network RM agent 114a, a storage RM agent 115a, and the AP managing unit 116a.

The servers 110b, 140a, 140b, 150a, and 150b include the same function units as those of the server 110a. Therefore, the function units of the servers 110b, 140a, 140b, 150a, and 150b are not shown in FIG. 3, and explanations thereof are omitted.

The servers 110c, 140c, and 150c are servers that are pooled, and do not include each of the resource manager agent 111a, the server RM agent 112a, the software RM agent 113a, the network RM agent 114a, the storage RM agent 115a, and the AP managing unit 116a.

When the server 110c, 140c, or 150c is set as a server available for tasks, a computer program that realizes each of the function units is installed on the server 110c, 140c, or 150c, which is executed to realize each of the function units.

The resource manager agent 111a is an agent that receives a request for executing process such as setting and information collection from the domain management server 50 of the system resource domain manager 51 for the server 110a, and performs processes in cooperation with the server RM agent 112a, the software RM agent 113a, the network RM agent 114a, and the storage RM agent 115a.

The server RM agent 112a is an agent that performs a boot and a shutdown of the server 110a, a collection of information about hardware, a setting, and the like. The software RM agent 113a is an agent that performs software installation, setting, and collection of information about software for the server 110a.

The network RM agent 114a is an agent that performs information collection, setting, and the like related to a network connected to the server 110a. The storage RM agent 115a is an agent that performs information collection, setting, and the like related to a storage connected to the server 110a.

The storages 160a to 160c are storages used by the servers 110a to 110c that belong to the web domain 190, the servers 140a to 140c that belong to the AP domain 200, and the servers 150a to 150c that belong to the DB domain 210. The storage 160d is a storage that is pooled. The storages 160a to 160d are constituted of RAID devices.

A VLAN (virtual local area network) is set as a network that connects between the servers 110a to 110c that belong to the web domain 190, the servers 140a to 140c that belong to the AP domain 200, and the servers 150a to 150a that belong to the DB domain 210.

Figure 4:
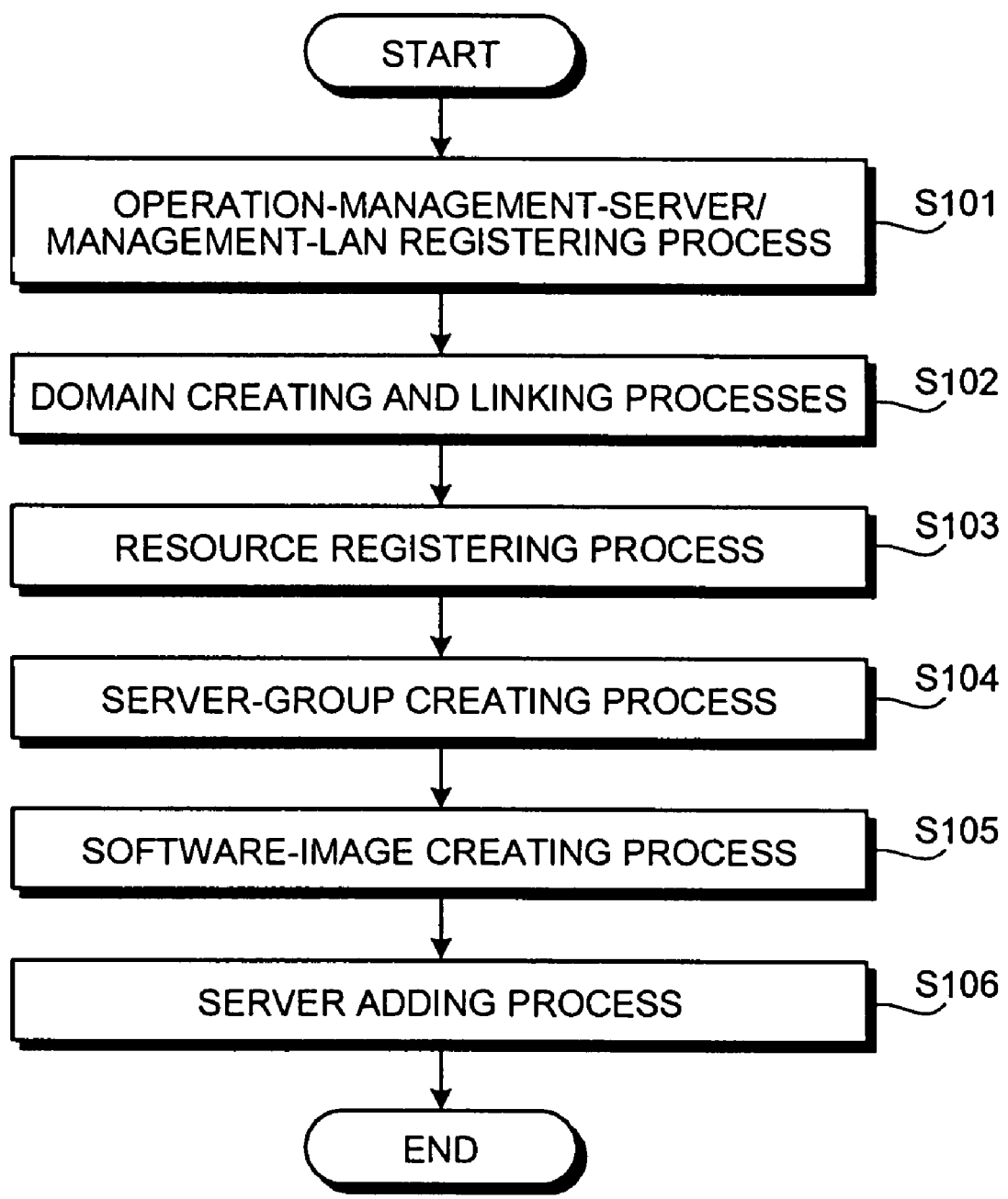
FIG. 4 is a flowchart for explaining a processing procedure of processing for assigning a server to a job.

A processing procedure of a server assigning process to a task is explained next. FIG. 4 is a flowchart of a processing procedure for assigning a server to a task.

In the following explanation, it is assumed that an operation management program is previously installed on the site management server 20, which causes the site management server 20 to perform functions of the system resource manager 21, the server RM 22, the software RM 23, the network RM 24, the storage RM 25, the system resource DB 26, and the AP-management control unit 27.

Furthermore, a program is previously installed on the domain management servers 50 and 60, which causes the domain management servers 50 and 60 to perform functions of the system resource domain manager 51, the server sub RM 52, the software sub RM 53, and the network sub RM 54.

Moreover, programs are previously installed on each of the servers 110a, 110b, 140a, 140b, 150a, and 150b, which cause the servers 110a, 110b, 140a, 140b, 150a, and 150b to perform functions of the resource manager agent 111a, the server RM agent 112a, the software RM agent 113a, the network RM agent 114a, the storage RM agent 115a, and the AP managing unit 116a.

As shown in FIG. 4, the system resource manager 21 of the site management server 20 performs a registering process of an operation management server and a management-LAN (step S101). The operation management server and the management-LAN are the site management server 20, the domain management server 50, and the LAN used for managing management target resources such as the servers 110a to 110c, 140a to 140c, and 150a to 150c, and the SAN 170.

The process performed at step S101 is explained in detail below. FIG. 5 is a diagram of an example of site data 300 registered as information on an operation management server. The site data 300 contains information on site name, site management server name, and domain management server name.

The site name is information for identifying a site that includes a resource to be managed. The site management server name is information for identifying the site management server 20 set to manage the site. The domain management server name is information for identifying the domain management servers 50 and 60 set to manage domains set in the site.

FIG. 6 is a diagram of an example of domain management server data 310 registered as information on the domain management servers 50 and 60. The domain management server data 310 contains information on domain management server name and management subnet name.

The domain management server name is the same information as the domain management server name explained in connection with FIG. 5. The management subnet name is information for identifying a subnet (a management subnet) in which a resource is to be managed by the domain management servers.

FIG. 7 is a diagram of an example of management subnet data 320 registered as information on subnets to be managed. The management subnet data 320 contains information on management subnet name, network address, netmask, and default gateway.

The management subnet name is the same information as the management subnet name explained in connection with FIG. 6. The network address is a network address for identifying the management subnet. The netmask is a netmask that defines which bits in an IP address are to be used as the network address. The default gateway is information on an IP address for identifying a default gateway used for transmitting data to outside the management subnet.

At step S101, the system resource manager 21 receives information on a site, a site management server, and a domain management server set by the user operating the operation management client 10 and registers the information in the site data 300 shown in FIG. 5.

The system resource manager 21 receives information on the domain management server and a management sub-network set by the user operating the operation management client 10 and registers the information in the domain management server data 310 shown in FIG. 6.

Thereafter, the system resource manager 21 registers information on network address, netmask, and default gateway, which correspond to the management subnet explained in FIG. 6, to the management subnet data 320 shown in FIG. 7.

In addition, the system resource manager 21 notifies the AP-management control unit 27 of occurrence of an event such as addition to or deletion from the servers 110a to 110c, 140a to 140c, and 150a to 150c, and sets commands for executing various processes in cooperation with the AP-management control unit 27.

FIG. 8 is a diagram of an example of middleware cooperation IF data 330 including commands for performing various processes in cooperation with middleware. The middleware cooperation IF data 330 contains information on middleware name, target event, timing, location, and execution command.

The middleware name is information on middleware with which the system resource manager 21 performs processes. The target event is information on events that the system resource manager 21 requests the middleware to execute. The timing is information on timing at which the system resource manager 21 transmits a request for executing processes to the middleware (before or after a process for the target event)

The location is information on locations where the middleware executes a command (a "manager" or an "agent"). The "manager" indicates that the command is executed on the site management server 20, while the "agent" indicates that the command is executed on the servers 110a to 110c, 140a to 140c, and 150a to 150c to be managed. The execution command is information on commands that notifies the middleware of occurrence of various events.

Referring back to FIG. 4, the system resource manager 21 performs a domain creating process and a linking process between created domains (step S102). The processes performed at step S102 is explained in detail below.

FIG. 9 is a diagram of an example of server domain data 340 stored as information on server domains to which the servers 110a to 110c, 140a to 140c, and 150a to 150c belong.

The server domain data 340 contains information on server domain name, server architecture name, and management subnet name. The server domain name is information for identifying a domain to which the servers 110a to 110c, 140a to 140c, and 150a to 150c belong.

The server architecture name is information for identifying CPU (Central Processing Unit) architecture of the servers 110a to 110c, 140a to 140c, and 150a to 150c that belong to each of the server domains. The management subnet name is the same information as the management subnet name shown in FIG. 6.

At step S102, the system resource manager 21 receives information on settings of the server domains and the server architectures specified by the administrator by operating the operation management client 10, and registers received information to the server domain data 340. The server domains are set in units of the management subnet set at step S101.

In addition, at step S102, the system resource manager 21 sets server groups belonging to respective server domains and sets a pool group shared among the server groups and a pool group exclusively used by a specific server group.

In this case, the server group is created by classifying servers in the same server domain into one or more groups. The pool group is a pool of the servers assigned to each of the server groups.

FIG. 10 is a diagram of an example of pool group data 350 stored as information on pool groups. The pool group data 350 contains information on pool group name, type, and server domain name.

The pool group name is information for identifying a pool of each of the servers described above. The type is information that indicates whether the pool group is to be shared by a plurality of the server groups or to be exclusively permitted for usage by specific server groups. The server domain name is the same information as the server domain name explained in connection with FIG. 9.

The system resource manager 21 assigns the pool group to each of the server domains. When the server domain includes a plurality of the sever groups, the system resource manager 21 assigns the pool group exclusive to the server groups.

Thereafter, the system resource manager 21 receives information on a storage domain set by the user operating the operation management client 10 and registers the information in the system resource DB 26 as storage domain data 360 explained below.

FIG. 11 is a diagram of an example of the storage domain data 360 stored as information on storage domains. The storage domain data 360 contains information on storage domain name and redundancy of path. The storage domain name is information for identifying a set storage domain. The redundancy of path is information on redundancy of a data communication path on the SAN.

Moreover, the system resource manager 21 receives information on network sub-domains set by the user operating the operation management client 10 and registers the information in the system resource DB 26 as network sub-domain data 470 explained below.

The network sub-domains are sub-domains obtained by further dividing a network domain to which a plurality of network devices for connecting servers belonging to different server domains belongs.

Figure 12:
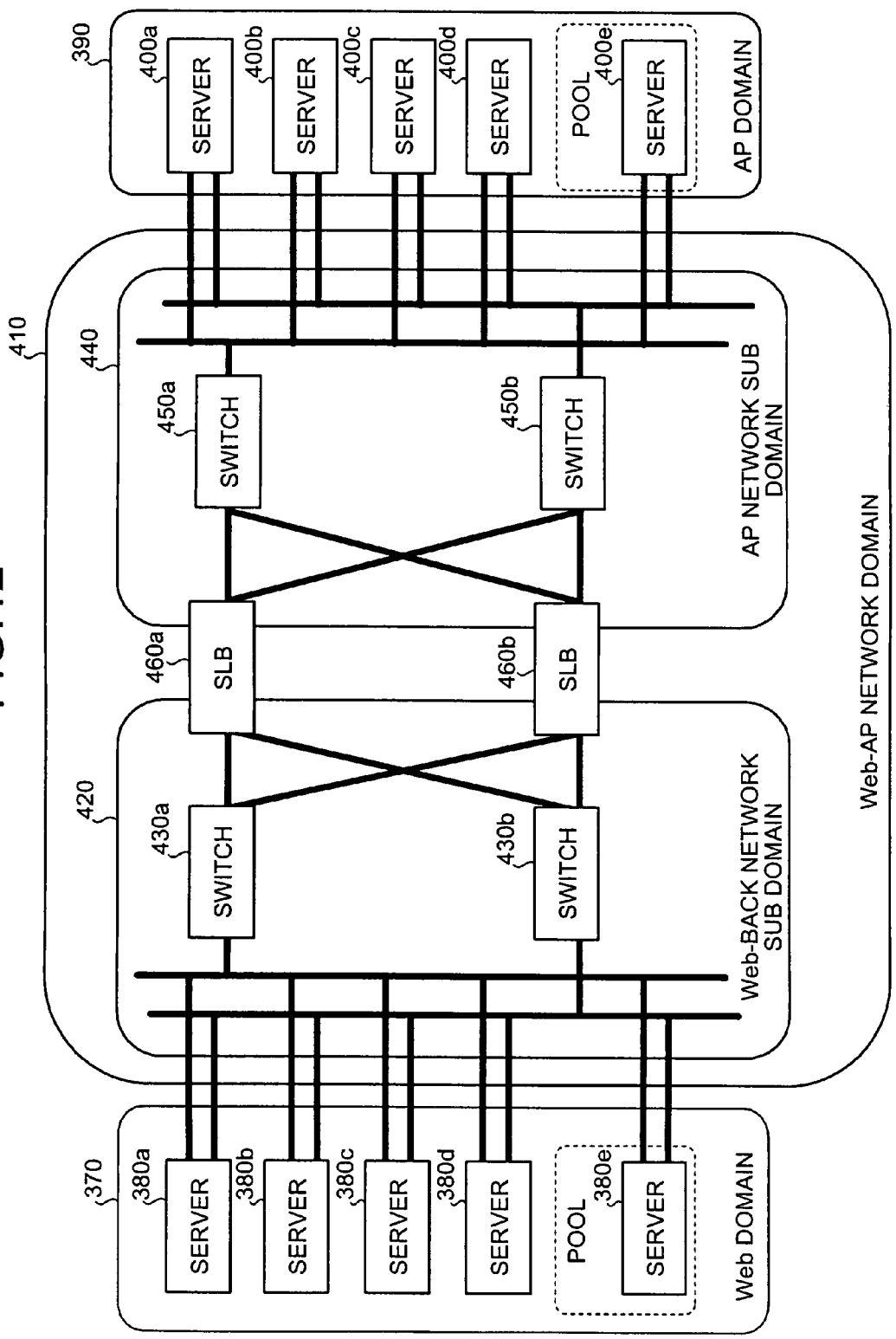
FIG. 12 is a diagram for explaining network domains and network sub-domains.

FIG. 12 is a diagram for explaining a network domain and network sub-domains. In FIG. 12, switches 430a, 430b, 450a, and 450b and SLBs 460a and 460b that connect servers 380a to 380e belonging to a Web domain 370 and servers 400a to 400e belonging to an AP domain 390 are shown.

The switches 430a and 430b constitute a "Web-Back" network sub-domain 420 and the switches 450a and 450b constitute an "AP-Front" network sub-domain 440.

The "Web-Back" network sub-domain 420, the "AP-Front" network sub-domain 440, the SLB 460a, and the SLB 460b constitute a "Web-AP" network domain 410.

FIG. 13 is a table of an example of network sub-domain data that stores information on network sub-domains. The network sub-domain data 470 stores information on a network sub-domain name, a switch model, and a switch management IP.

The network sub-domain name is information for identifying the network sub-domains explained with reference to FIG. 12. The switch model is information on models of switches belonging to the network sub-domains. The switch management IP is information on IP addresses allocated to the respective switches for management.

The system resource manager 21 receives information on network domains set by the user operating the operation management client 10 and registers the information in the system resource DB 26 as network domain data 480 explained below.

FIG. 14 is a table of an example of the network domain data 480 that stores information on network domains. The network domain data 480 stores information on a network domain name, a front network sub-domain name, a connection system, an apparatus name, a back network sub-domain name, and a redundancy system.

The network domain name is identification information for identifying the network domain explained with reference to FIG. 12. The front network sub-domain name is identification information for identifying, when the network domain is divided into two network sub-domains with the SLBs 460a and 460b as a boundary as shown in FIG. 12, a network sub-domain closer to the Internet 70.

The connection system is information on a system for connecting network devices such as the switches 430a and 430b belonging to the front network sub-domain and network devices such as the switches 450a and 450b belonging to a back network sub-domain explained later. For example, as this system, there are a system for connecting the network devices with a load balancer, a system for connecting the network devices with a firewall, and the like. The apparatus name is identification information for identifying the network devices.

The back network sub-domain name is identification information for identifying, when the network domain is divided into two network sub-domains with the SLBs 460a and 460b as boundaries, a network sub-domain more distant from the Internet 70. The redundancy system is information indicating a system for redundancy at the time when data communication paths are redundant in the network domain.

Moreover, the system resource manager 21 receives information on connection apparatuses of the network sub-domains set by the user operating the operation management client 10 and registers the information in the system resource DB 26 as load distribution apparatus data 490 explained below. The connection apparatuses of the network sub-domains refer to apparatuses such as the SLBs 460a and 460b explained with reference to FIG. 12.

FIG. 15 is a table of an example of the load distribution apparatus data 490 that stores information on load distribution apparatuses. The load distribution apparatus data 490 stores information on a load distribution apparatus name, a management IP, a model name, an SNMP community name, and an ID/password.

The load distribution apparatus name is a name for identifying the connection apparatuses of the network sub-domains. The management IP is information on IP addresses allocated to the respective connection apparatuses for management of the connection apparatuses. The model name is identification information of models of the connection apparatuses.

The SNMP (Simple Network Management Protocol) community name is information specifying SNMP communities to which the domain management servers 50 and 60 and the site management server 20 that manage the connection apparatuses and the connection apparatuses belong. The ID/password is information on IDs and passwords necessary for accessing the connection apparatuses.

The system resource manager 21 receives information on network groups set by the user operating the operation management client 10 and registers the information in the system resource DB 26 as network sub-group data 660 explained below.

The network sub-groups are obtained by dividing, when a server group is set for servers belonging to server domains, a network for connecting server groups belonging to different server domains into a plurality of networks.

Figure 16:
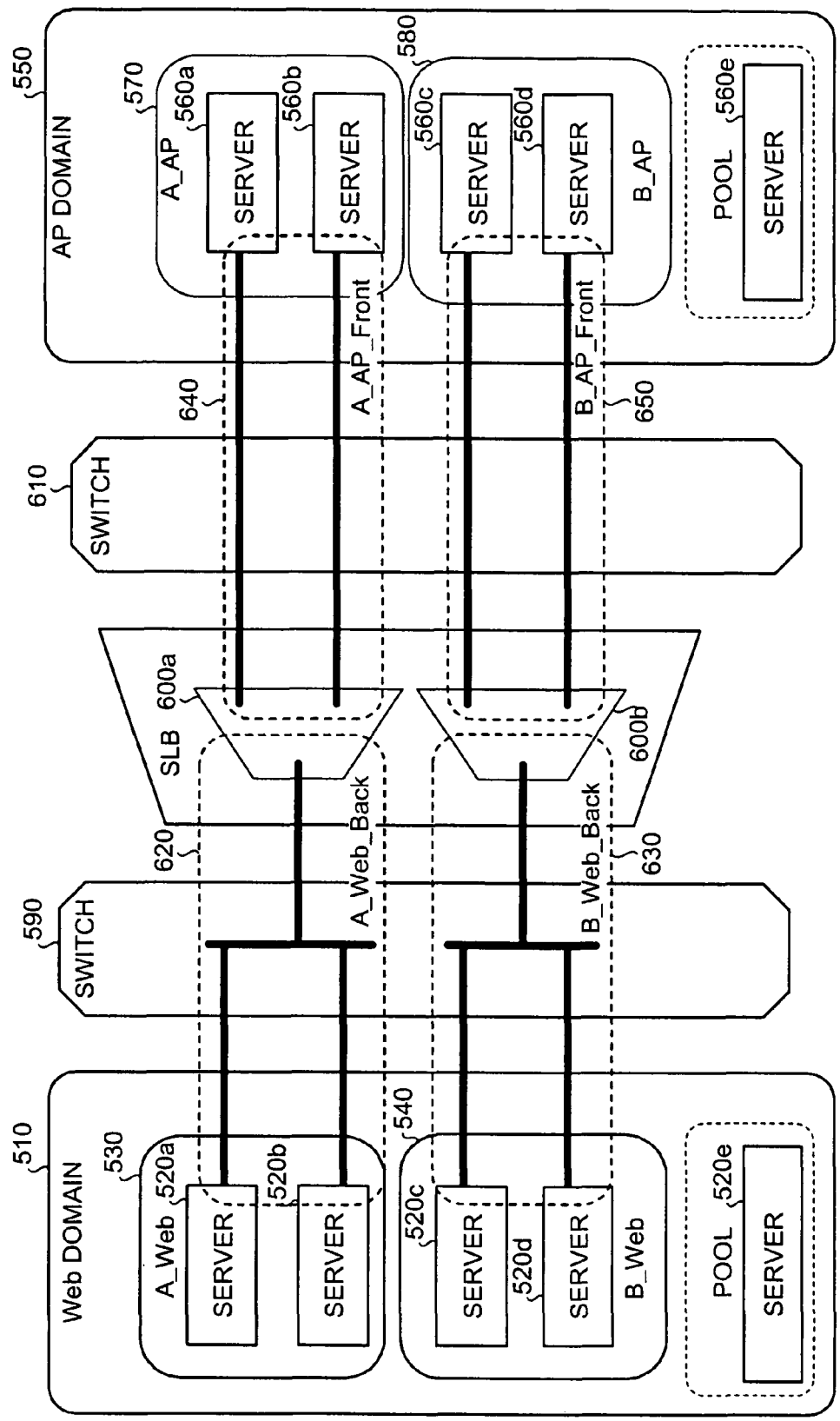
FIG. 16 is a diagram for explaining an example of a structure of network sub-groups.

FIG. 16 is a diagram for explaining an example of a structure of a network sub-group. In FIG. 16, switches 590 and 610 and SLBs 600a and 600b that connect servers 520a to 520e belonging to a Web domain 510 and servers 560a to 560e belonging to an AP domain 550 are shown.

The servers 520a and 520b constitute an "A_Web" server group 530, the servers 520c and 520d constitute a "B_Web" server group 540, the servers 560a and 560b constitute an "A_AP" server group 570, and the servers 560c and 560d constitute a "B_AP" server group 580.

A network connecting the "A_Web" server group 530 and the SLB 600a constitutes an "A_Web_Back" network sub-group 620. Networks connecting the "B_Web" server group 540 and the SLB 600b constitute a "B_Web_Back" network sub-group 630. Networks connecting the SLB 600a and the "A_AP" server group 570 constitute an "A_AP_Front" network sub-group 640. Networks connecting the SLB 600b and the "B_AP" server group 580 constitute a "B_AP_Front" network sub-group 650.

FIG. 17 is a table of an example of the network sub-group data 660 that stores information on network sub-groups. The network sub-group data 660 stores information on a network sub-group name, a network sub-domain name, a sub-network, and a redundancy sub-network.

The network sub-group name is identification information for identifying the network sub-group explained by citing the example with reference to FIG. 16. The network sub-domain name is identification information for identifying network sub-domains to which the network sub-groups belong.

The sub-network is information on a network address and a sub-network mask allocated to the network sub-groups. The redundancy sub-network is information on network addresses and sub-network masks allocated to a network including data communication lines added excessively when networks belonging to the network sub-group are made redundant using a plurality of data communication lines.

Thereafter, the system resource manager 21 receives information on a correspondence relation among server domains set by the user operating the operation management client 10 and registers the information in the system resource DB 26 as inter-server-domain link data 670 explained below.

FIG. 18 is a table of an example of the inter-server-domain link data 670 that stores the information on the correspondence relation among the server domains. The inter-server-domain link data 670 stores information on a front server domain name, a network domain name, and a back server domain name.

The front server domain name is identification information for identifying a server domain closer to the Internet 70 side of the server domains on both the sides of the network domain shown in FIG. 12. The network domain name is identification information of the network domain explained with reference to FIG. 12. The back server domain name is information indicating a server domain on a side more distant from the Internet 70 of the server domains on both the sides of the network domain shown in FIG. 12.

Moreover, the system resource manager 21 receives information on a correspondence relation between server domains and storage domains set by the user operating the operation management client 10 and registers the information in the system resource DB 26 as inter-server/storage-domain link data 680 explained below.

Figure 19:
FIG. 19 is a table of an example of inter-server/storage-domain link data that stores information on a correspondence relation between server domains and storage domains.

FIG. 19 is a table of an example of the inter-server/storage-domain link data 680 that stores information on a corresponding relation between server domains and storage domains. The inter-server/storage-domain link data 680 stores information on a server domain name and a storage domain name. The server domain name is information same as the server domain name shown in FIG. 9. The storage domain name is information same as the storage domain name shown in FIG. 11.

Referring back to FIG. 4, the system resource manager 21 performs a registering process of server resources and storage resources to be managed (step S103). The process performed at step S103 is explained in detail below.

First, the system resource manager 21 receives, when the user operates the operation management client 10 and performs selection of a management sub-network in which a server is registered, information on the management sub-network selected by the user.

The system resource manager 21 also receives information on servers to be managed, which is input by the administrator by operating the operation management client 10, from the operation management client 10, and stores received information in the domain resource DB 55 of the domain management server 50 as network boot server data 690 explained below. Subsequently, the servers registered are network booted, and registered as the server resources after various information on the severs are acquired.

Figure 20:
FIG. 20 is a table of an example of network boot server data that stores information on servers subjected to network boot.

FIG. 20 is a diagram of an example of the network boot server data 690 stored as information on network boot servers. The network boot server data 690 contains information on MAC address, IP address, and host name.

The MAC address is information on a MAC address of the server. The IP address is information on an IP addresses assigned to the server. The host name is information on a host name assigned to the server.

When the system resource manager 21 receives information on an MAC address inputted by the user of the server that performs the network boot, the system resource manager 21 automatically allocates an IP address and a host name to a server corresponding to the MAC address.

The system resource manager 21 performs network boot on the server to which the IP address and the host name are assigned, by using the virtual OS stored in the domain resource DB 55 of the domain management server 50, in cooperation with the system resource domain manager 51 of the domain management server 50.

The server sub RN 52, the resource manager agent 111a, and the server RM agent 112a work together to collect information on hardware of the server and transmit collected information to the system resource domain manager 51.

Thereafter, the system resource manager 21 acquires the information on the hardware of the server from the system resource domain manager 51 and stores the information in the system resource DB 26 as management target server data 700 explained below.

When the user operates the operation management client 10 to input setting information concerning whether SAN boot for booting up the server should be performed from the storages 160a to 160d connected via the SAN 170, the system resource manager 21 receives the setting information and registers the setting information in the management target server data 700.

FIG. 21 is a diagram of an example of the management target server data 700 stored as information on servers to be managed. The management target server data 700 contains information on server name, IP address, MAC address, server architecture name, model name, SAN boot, and status.

The server name is a name for identifying a server to be managed. The IP address is an IP address that is assigned to the server. The MAC address is a MAC address of the server. The server architecture name is information for identifying CPU architecture of the server. The model name is information that indicates the model of the server. The SAN boot is setting information as to whether the storages 160a to 160b connected to the server via the SAN 170 perform SAN boot to boot the server. The status is information that indicates whether an error is occurring in the server.

The user designates a MAC address and selects a server that performs network boot. However, the selection of a server may be performed automatically. Specifically, when the user operates the operation management client 10 to set information on a number of servers automatically selected, the system resource manager 21 receives the setting information from the operation management client 10.

The system resource manager 21 selects servers of specified number, and registers information on an IP address and a host name of the servers to the network boot server data 690 shown in FIG. 20.

In cooperation with the system resource domain manager 51 in the domain management server 50, the system resource manager 21 performs network boot on the servers assigned the IP address and the host name using the virtual OS stored in the domain resource DB 55 in the domain management server 50.

With the cooperation of the server sub RM 52, the resource manager agent 111a, and the server RM agent 112a, information on the MAC address, server architecture, model, and status of each server is collected and transmitted to the system resource domain manager 51.

After that, the system resource manager 21 obtains the information on the MAC address, server architecture, model, and status of each server from the system resource domain manager 51. The system resource manager 21 stores the information in the system resource DB 26 as the management target server data 700.

Subsequently, the system resource manager 21 registers a storage device to be managed. Examples of the storage device include FC (Fiber Channel) switch and RAID device.

Specifically, when an administrator inputs information on the IP address of a storage to be registered as a management target with respect to each management subnet shown in FIG. 7, the system resource manager 21 receives the information from the operation management client 10. The system resource manager 21 stores information on a storage device corresponding to the IP address in the system resource DB 26, thereby registering the storage device.

The system resource manager 21 adds the servers registered to the management target server data 700 shown in FIG. 21 to a server domain. Specifically, when the administrator specifies a server and a server domain where the server is to be added by operating the operation management client 10, the system resource manager 21 receives the information on the server and the server domain from the operation management client 10.

Referring to the management target server data 700 shown in FIG. 21, the system resource manager 21 checks whether the server architecture of the server matches server architecture registered to the server domain data 340 shown in FIG. 9.

The system resource manager 21 retrieves the management target server data 700 shown in FIG. 21, and checks that SAN boot is to be performed on the server.

Moreover, the system resource manager 21 checks a wire connection state of a network of the server added to the server domain. Specifically, the system resource manager 21 reads the inter-server-domain link data 670 shown in FIG. 18 and acquires information on a front server domain and a back server domain corresponding to the server domain.

The system resource manager 21 reads the network domain data 480 shown in FIG. 14 and acquires information on a front sub-domain and a back sub-domain corresponding to the network domain.

Thereafter, the system resource manager 21 reads the network sub-domain data 470 shown in FIG. 13 and specifies switches corresponding to the front sub-domain and the back sub-domain.

The system resource manager 21 requests the network RM 24 and the network sub RM 54 to check the connection between the server and the switches. Moreover, the network RM 24 and the network sub RM 54 requests the network RM agent 114a to check the connection between the server and the switches and acquires a check result.

When there is no problem in the connection between the server and the switches, the system resource manager 21 stores, in association with the pool groups explained with reference to FIG. 10, information on the server in the system resource DB 26 as provisioning configuration data 710 explained below.

FIG. 22 is a diagram of an example of the provisioning configuration data 710 stored as information on groups to which servers belong. The provisioning configuration data 710 contains information on server name, pool group name, server group name, storage sub-group name, and accessibility.

The saver name is the same information as described in connection with FIG. 21. The pool group name is the same information as described in connection with FIG. 10. The server group name is information for identifying a server group when servers on the same server domain are classified into one or more groups. At this point, information on the server group name has not been registered.

The storage sub-group name is information for identifying a storage group when storages on the same storage domain are classified into one or more groups and assigned to each server in the server group. At this point, information on the storage sub-group name has not been registered. The accessibility is information that indicates whether a server is allowed to access storages. At this point, information on the accessibility has not been registered.

After registering the saver name and the pool group name to the provisioning configuration data 710, the system resource manager 21 registers the storage device, which has been previously registered, in a storage domain.

Specifically, when the user operates the operation management client 10 to designate a storage domain and a storage device registered in the storage domain, the system resource manager 21 receives information on the storage domain and the storage device from the operation management client 10.

The system resource manager 21 reads the inter-server/storage-domain link data 680 shown in FIG. 19 and specifies a server domain corresponding to the storage domain.

Moreover, the system resource manager 21 checks, in cooperation with the storage RM 25 and the storage RM agent 115a, uniformity of the connection between servers belonging to the server domain specified and storage devices belonging to the storage domain.

Figure 23:
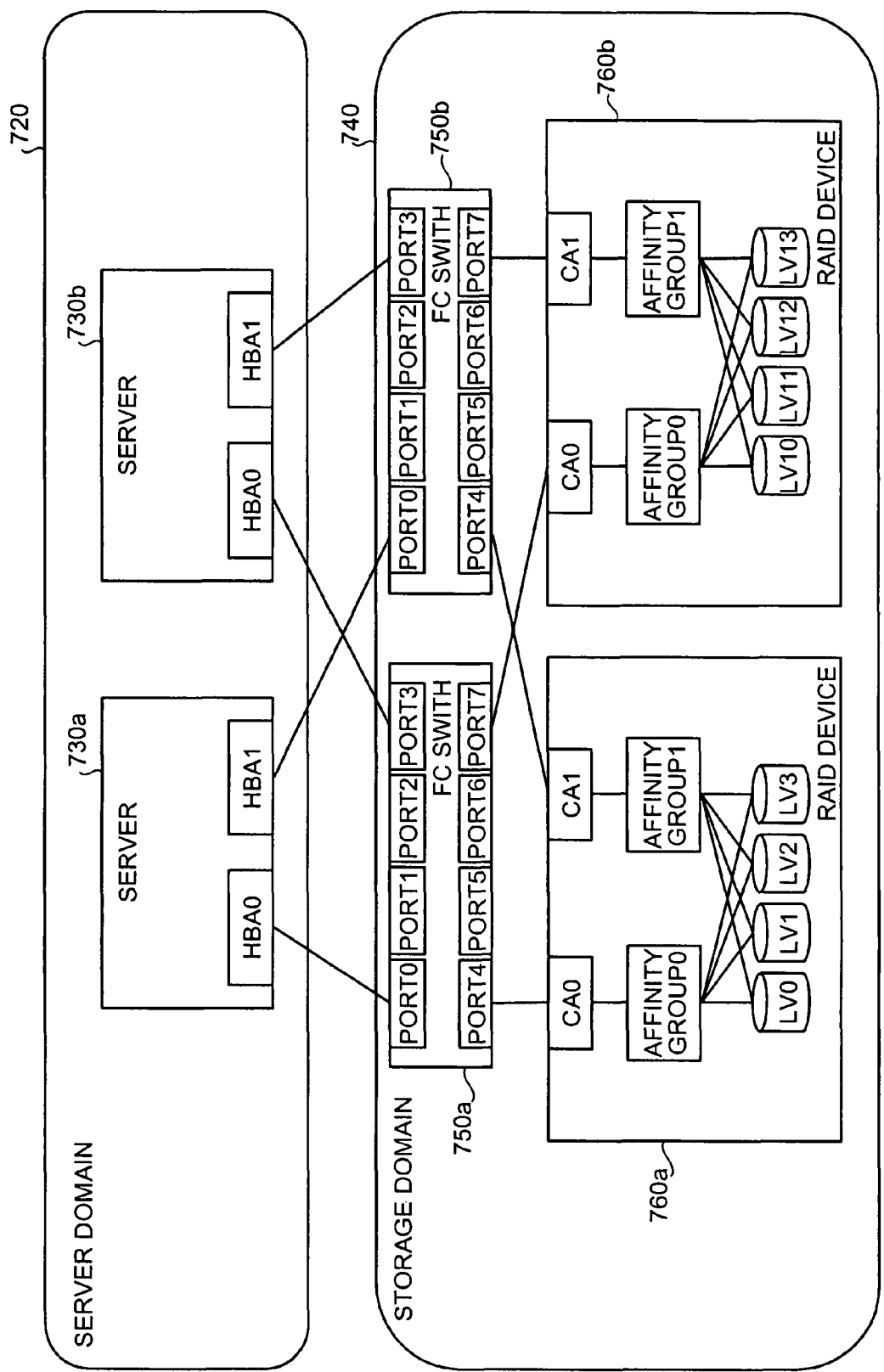
FIG. 23 is a diagram of an example of the connection between servers and storage devices having a uniform connection state.

FIG. 23 is a diagram of an example of the connection between servers and storage devices having a uniform connection state. As shown in FIG. 23, in this example, a connection state between an FC switch 750a belonging to a storage domain 740 and servers 730a and 730b belonging to a server domain 720 and a connection state between an FC switch 750b belonging to the storage domain 740 and the servers 730a and 730b are uniform.

A connection state between the FC switches 750a and 750b and a RAID device 760a belonging to the storage domain 740 and a connection state between the FC switches 750a and 750b and a RAID device 760b belonging to the storage domain 740 are uniform.

The system resource manager 21 performs the check of uniformity of the connection based on information on a WWPN (World Wide Port Name). In that case, the system resource manager 21 reads information on multiplicity of paths of the storage domains from the storage domain data 360 shown in FIG. 11, and performs check of redundancy. FIG. 24 is a diagram for explaining processing for checking uniformity of the connection based on the WWPN.

In FIG. 24, RAID device WWPN data 770a and 770b stored by the RAID devices 760a and 760b, FC switch WWPN data 780a and 780b stored by the FC switches 750a and 750b, and server WWPN data 790a and 790b stored by the servers 730a and 730b shown in FIG. 23 are shown.

The RAID device WWPN data 770a and 770b store information on a CA (Channel Adapter) and a WWPN. The CA is identification information of channel adapters held by the RAID devices 760a and 760b. The WWPN is information on WWPNs allocated to the channel adapters held by the RAID devices 760a and 760b.

FC switch WWPN data 780a and 780b store information on a port and a partner WWPN. The port is identification information of ports of the FC switches 750a and 750b. The partner WWPN is information on WWPNs allocated to the channel adapters of the RAID devices 760a and 760b connected to the ports of the FC switches 750a and 750b or information on WWPNs allocated to HBAs (Host Bus Adapters) of the servers 730a and 730b connected to the ports of the FC switches 750a and 750b.

The server WWPN data 790a and 790b store information on an HBA and a WWPN. The HBA is identification information of HBAs held by the servers 730a and 730b. The WWPN is information on WWPNs allocated to the HBA held by the servers 730a and 730b.

The system resource manager 21 collects the RAID device WWPN data 770a and 770b, the FC switch WWPN data 780a and 780b, and the server WWPN data 790a and 790b from the RAID devices 760a and 760b, the FC switches 750a and 750b, and the servers 730a and 730b and checks a correspondence relation among the WWPNs. Consequently, the system resource manager 21 can check uniformity of connection states among the devices.

Thereafter, the system resource manager 21 registers, as storages for pools, a storage area of a LUN (Logical Unit) set in advance and a storage area of a LUN not set.

Subsequently, the system resource manager 21 performs processing for creating a server group (step S104). The processing performed at step S104 is explained more in detail.

First, the system resource manager 21 receives information on a storage template set by the user operating the operation management client 10 and registers the information in the system resource DB 26 as storage template data 800 explained below. The storage template is setting information concerning a structure of a storage for server group created later.

FIG. 25 is a table of an example of the storage template data 800 that stores data on storage templates. The storage template data 800 stores information on a storage template name, a disk type, a disk name, necessity of reliability, a degree of load, a disk capacity, and a boot disk.

The storage template name is identification information for identifying the template set. The disk type is information indicating a type of use of a disk belonging to the storage template.

For example, "root" indicates that the disk is used for storing system data, "local" indicates that the disk is used for storing data of individual servers, and "shared" indicates that the disk is used for storing data shared among the servers.

The disk name is a name for identifying a disk allocated to each disk. The necessity of reliability is information on reliability required for the disk. The degree of load is information on a degree of load applied to the disk. The disk capacity is a storage capacity of the disk. The boot disk is information indicating whether the disk is used for boot of a system.

Subsequently, the system resource manager 21 receives information on a server group set by the user operating the operation management client 10 and stores the information in the system resource DB 26 as server group data 810 explained below.

FIG. 26 is a table of an example of the server group data 810 that stores information on server groups. The server group data 810 stores information on a server group name, a server domain name, a software distribution image name, the number of copies, a storage template name, SAN boot, and automatic recovery.

The server group name is identification information of groups obtained by dividing servers included in an identical server domain into one or more groups. The server domain name is identification information of a server domain to which the server group belongs. The software distribution image name is information for identifying an image file of software distributed to servers belonging to the server group.

The number of copies is information on the number of copies of the software distribution image. The storage template name is information same as the storage template name explained with reference to FIG. 25. The SAN boot is information indicating whether SAN boot for the servers belonging to the server group is performed. The automatic recovery is information indicating whether, when a failure occurs in a server of a scale-out structure in which a plurality of servers operate in cooperation with one another, processing for automatically adding a server is executed.

Thereafter, the system resource manager 21 registers information on a storage group corresponding to the server group in the system resource DB 26 explained below as server/storage group link data 820. The storage group is obtained by dividing storages included in an identical storage domain into one or more groups.

FIG. 27 is a table of an example of the server/storage group link data 820 that stores information on storage groups corresponding to server groups. The server/storage group link data 820 stores information on a server group name, a storage group name, and a storage domain name.

The server group name is information same as the server group name shown in FIG. 26. The storage group name is identification information of a storage group generated in association with each server group. The storage domain name is identification information of a storage domain to which the storage group belongs.

In generating a storage group, the system resource manager 21 reads information on a storage template associated with the server group from the server group data 810 shown in FIG. 26 and reads information on a disk type corresponding to the storage template from the storage template data 800 shown in FIG. 25.

The system resource manager 21 generates, for each disk type such as "root", "local", or "shared", a storage group for each server group and registers information on the storage group in the server/storage group link data 820.

Moreover, the system resource manager 21 reads information on a storage domain corresponding to the server domain to which the server group belongs from the inter-server/storage-domain link data shown in FIG. 19 and registers the information in the server/storage group link data 820.

Thereafter, the system resource manager 21 transmits a command for causing the AP managing unit 116a to recognize the addition of the server group to the AP managing unit 116a. Specifically, the system resource manager 21 transmits "issvgrp add" shown in FIG. 8 to the AP managing unit 116a.

Subsequently, the system resource manager 21 receives information on a correspondence relation among the server groups set by the user operating the operation management client 10 and registers the information in the system resource DB 26 as inter-server-group link data 830 explained below.

FIG. 28 is a table of an example of the inter-server-group link data 830 that stores information on a correspondence relation among server groups. The inter-server-group link data 830 stores information on a front server group name, a network group name, and a back server group name.

The front server group name is identification name for identifying a server group closer to the Internet 70 side among server groups connected by a network group. The network group is a group of networks obtained by combining the network sub-groups explained with reference to FIG. 16 to connect server groups.

The network group name is identification information for identifying the network group. The back server group name is identification information for identifying a server group on a side distant from the Internet 70 among the server groups connected by the network group.

Thereafter, the system resource manager 21 stores information on the network group in the system resource DB 26 as network group data 850 explained below.

Specifically, first, the system resource manager 21 reads the inter-server-domain link data 670 shown in FIG. 18 and acquires information on a network domain set between two server domains.

The system resource manager 21 reads the network domain data 480 shown in FIG. 14 and acquires information on a front sub-domain, a back sub-domain, and an apparatus corresponding to the network domain.

Moreover, the system resource manager 21 reads the network sub-group data 660 shown in FIG. 17, retrieves a network sub-domain corresponding to the front sub-domain and the network sub-domain from the network sub-group data 660 and extracts an unused network sub-group among network sub-groups corresponding to the network sub-domain retrieved.

Subsequently, the system resource manager 21 divides network devices corresponding to information on an apparatus read from the network domain data 480 shown in FIG. 14 into one or more groups and stores information on the groups in the system resource DB 26 as load distribution group data 840 explained below.

FIG. 29 is a table of an example of the load distribution group data 840 that stores group information of load distribution apparatuses. The load distribution group data 840 stores information on a load distribution group name, a load balancer name, and a representative IP.

The load distribution group name is information for identifying groups obtained by dividing load balancers into one or more groups. The load balancer name is a name for identifying the load balancers. The representative IP is information on IP addresses allocated to the respective load distribution groups.

Thereafter, the system resource manager 21 stores, based on information on a correspondence relation among network domains, network sub-groups, load distribution groups, and the like belonging to the respective network groups, the information in the system resource DB 26 as network group data 850 explained below.

FIG. 30 is a table of an example of the network group data 850 that stores information on network groups. The network group data 850 stores information on a network group name, a network domain name, a front network sub-group name, a load distribution group name, and a back network sub-group name.

The network group name is information same as the network groups explained with reference to FIG. 28. The network domain name is information same as the network domains explained with reference to FIG. 18.

The front network sub-group name corresponds to the network sub-group name explained with reference to FIG. 17, which is identification information for identifying a network sub-group closer to the Internet 70 side of the network sub-groups on both the side of the load distribution group.

The load distribution group name is information same as the load distribution group name explained with reference to FIG. 29. The back network sub-group name corresponds to the network sub-group name explained with reference to FIG. 17, which is identification information for identifying a network sub-group on a side more distant from the Internet 70 of the network sub-groups on both the sides of the load distribution group.

Moreover, the system resource manager 21 applies setting of a VLAN of a network sub-group to the switches registered in the network sub-domain data 470 in FIG. 13 in association with the network RM 24 and the network sub RM 54.

Subsequently, the system resource manager 21 performs processing for adding a first server to the server group and creating a software image of software installed in the server (step S105). The processing performed at step S105 is explained more in detail below.

First, when the user operates the operation management client 10 to designate a server and a server group in which the server is registered, the system resource manager 21 receives information on the server and the server group and registers the server in the server group.

The system resource manager 21 reads the server group data 810 in FIG. 26, retrieves a storage template corresponding to the server group, and acquires setting conditions for the storage template from the storage template data 800 in FIG. 25.

Moreover, the storage RM 25 performs processing for setting logical volumes in storages pooled to satisfy the setting conditions for the storage template acquired by the system resource manager 21 and allocating the storages in which the logical volumes are set to the server group.

FIG. 31 is a flowchart for explaining a processing procedure of setting processing for setting logical volumes in RAID devices. As shown in FIG. 31, first, the system resource manager 21 acquires information on necessary conditions for logical volumes (step S201). The necessary conditions for the logical volume are information on the necessity of reliability, the degree of load, and the disk capacity.

Figure 32:
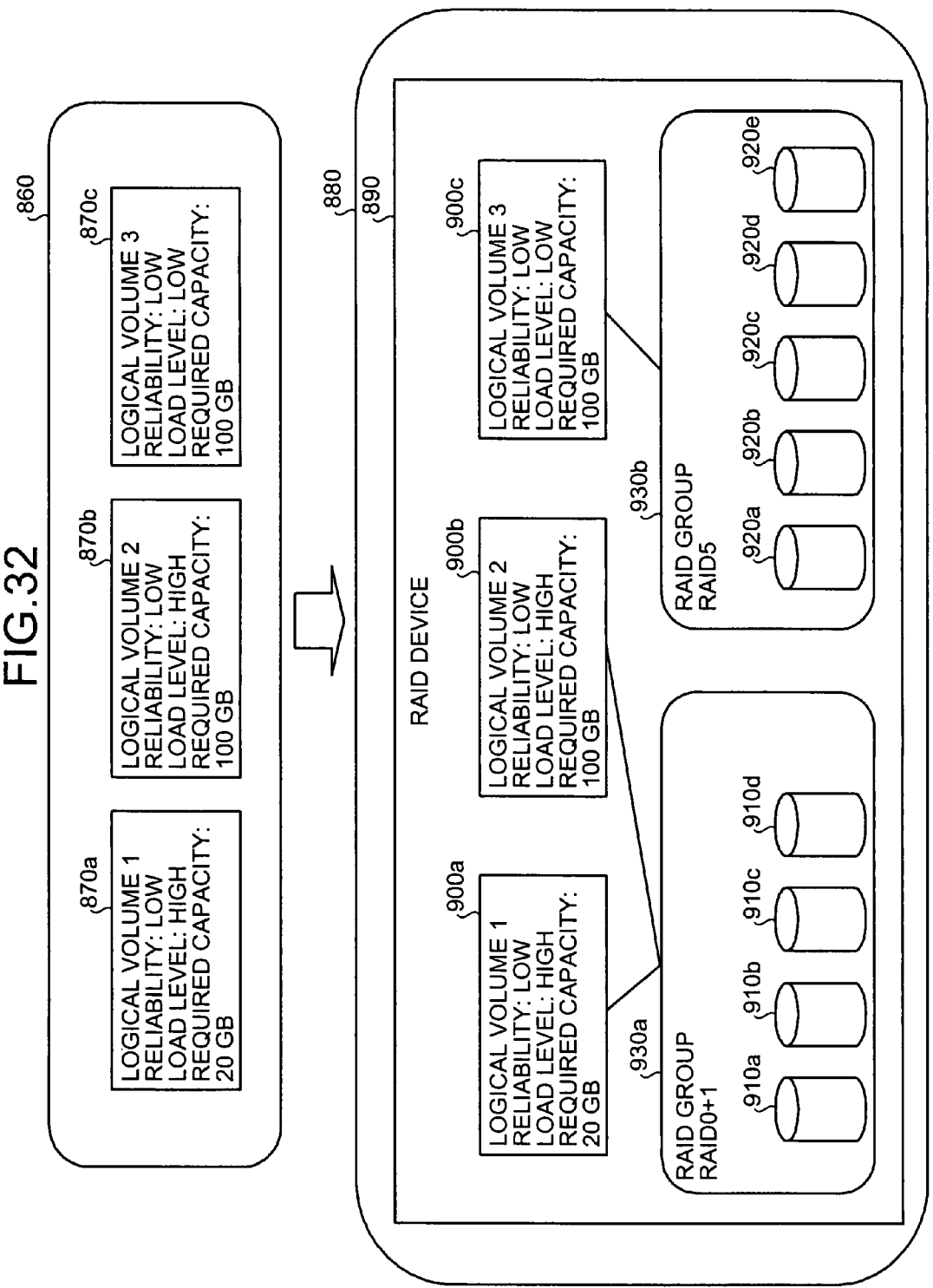
FIG. 32 is a diagram of an example of a screen for setting logical volumes.

FIG. 32 is a diagram of an example of a setting screen for logical volumes. In FIG. 32, a necessary-condition output screen 860 on which necessary conditions for logical volumes output to the operation management client 10 by the system resource manager 21 and a logical-volume-configuration output screen 880 after logical volume setting are shown.

In the example in FIG. 32, it is requested to create three logical volumes that satisfy three necessary conditions. Three necessary conditions 870*a* to 870*c* are output to the necessary-condition output screen 860.

Figure 33:
FIG. 33 is a table of an example of RAID level setting data that stores setting information of RAID levels.

Returning to the explanation of FIG. 31, the system resource manager 21 determines a RAID level of the RAID devices according to the necessity of reliability and the degree of load (step S202). FIG. 33 is a table of an example of RAID level setting data 940 that stores setting information of RAID levels.

The RAID level setting data 940 stores information on needs of reliability, a degree of load, and a RAID level. The necessity of reliability is information same as the necessity of reliability explained with reference to FIG. 25. The degree of load is information same as the degree of load explained with reference to FIG. 25. The RAID level is information on a RAID level determined by the necessity of reliability and the degree of load.

Returning to the explanation of FIG. 31, the system resource manager 21 determines a RAID device type from a total value of disk capacities required (step S203). FIG. 34 is a table of an example of RAID device data 950 that stores information on RAID devices.

The RAID device data 950 stores information on a total value of necessary storage capacities, a model of a RAID device, data access speed, the number of disk drives constituting a RAID group (in the case of RAID0+1), the number of disk drives constituting a RAID group (in the case of RAID5), and a maximum number of RAID groups.

The total value of necessary storage capacities is information on a total value of disk capacities required for logical volumes. The model of a RAID device is information on a model of a RAID device suitable for securing the total value of necessary storage capacities.

The data access speed is information on data access speed of a disk drive specified by the model of the RAID device. In this data access speed, information on three disk drive types of "first", "second", and "third" is stored in order from one with highest access speed.

The number of disk drives constituting a RAID group is information on the number of disk drives constituting a RAID group in the case of a RAID level of RAID0+1. The number of disk drives constituting a RAID group is information on the number of disk drives constituting a RAID group in the case of a RAID level of RAID5. The maximum number of RAID group is information on a maximum number of RAID groups created.

Returning to the explanation of FIG. 31, the system resource manager 21 acquires characteristic information of each RAID device type from the RAID device data 950 explained with reference to FIG. 34 (step S204).

The characteristic information is information on the disk drive type corresponding to "first" of the data access speed, the number of disk drives constituting a RAID group (in the case of RAID0+1), the number of disk drives constituting a RAID group (in the case of RAID5), and the maximum number of RAID groups.

The storage RM 25 creates logical volumes (step S205). Specifically, the storage RM 25 creates logical volumes satisfying the respective necessary conditions for logical volumes and sets the logical volumes in the RAID devices.

On the logical-volume-configuration output screen 880 shown in FIG. 32, a state in which logical volumes 910a to 910d and 920a to 920e satisfying respective necessary conditions 900a to 900c are set in a RAID device 890 is shown.

Returning to the explanation of FIG. 31, the storage RM 25 creates a RAID group obtained by grouping logical volumes having an identical RAID level (step S206). The storage RM 25 allocates the logical volumes to the RAID group created (step S207).

In the example in FIG. 32, since the logical volumes 910a to 910d satisfying the necessary conditions 900a and 900b have the same RAID level of RAID0+1, the logical volumes 910a to 910d are grouped as a RAID group 930a. Since the logical volumes 920a to 920e satisfying the necessary condition 900c have the RAID level of RAID5, the logical volumes 920a to 920e are grouped as a RAID group 930b.

In creating RAID groups, the storage RM 25 sets disk drives belonging to the respective RAID groups as a disk drive type determined by the data access speed of the RAID device data 950 in FIG. 34.

The storage RM 25 sets the number of disk drives constituting a RAID group as the number of disk drives determined by the number of disk drives constituting a RAID group (in the case of RAID0+1) or the number of disk drives constituting a RAID group (in the case of RAID5) of the RAID device data 950 in FIG. 34.

Moreover, the storage RM 25 creates RAID groups such that the number of the RAID group is equal to or smaller than the maximum number of RAID groups of the RAID device data 950 in FIG. 34.

On the logical-volume-configuration output screen 880 in FIG. 32, the logical volumes 910a to 910d and 920a to 920e satisfying the necessary conditions 900a to 900c and allocated to the respective RAID groups 930a and 930b are displayed as being connected to the necessary conditions 900a to 900c corresponding thereto.

Returning to the explanation of FIG. 31, the storage RM 25 creates a command file for reflecting the structure of the logical volumes shown in FIG. 32 on the RAID devices (step S208). The storage RM 25 reflects, based on the command file, the logical volumes created on the actual apparatuses (step S209).

Thereafter, the system resource manager 21 registers the logical volumes set in the RAID devices as storage sub-groups in association with the server groups to which the respective servers belong and sets an access right to the storage group of the servers. Specifically, the system resource manager 21 stores information on a server group name, a storage sub-group name, and accessibility in the provisioning configuration data 710 shown in FIG. 22.

FIG. 35 is a diagram of an example of provisioning configuration data 960 in which storage sub-groups are specified. The provisioning configuration data 960 is resultant after the information on server group name, storage sub-group name, and accessibility is added to the provisioning configuration data 710 shown in FIG. 22.

In causing the servers to recognize the logical volumes established in the RAID devices and registering the logical volumes as storage sub-groups, the storage RM 25 performs setting of logical volumes in a procedure described below.

Figure 36:
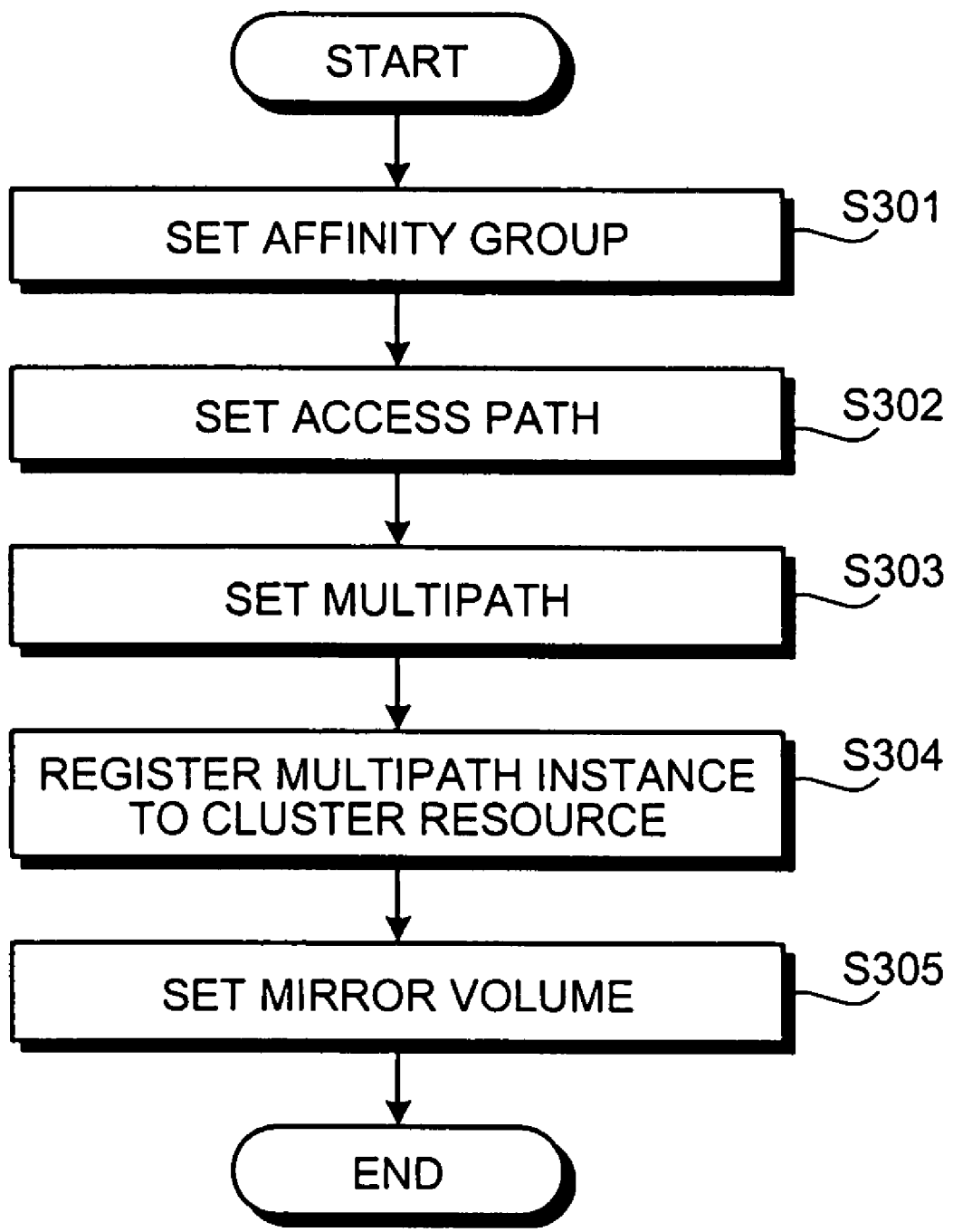
FIG. 36 is a flowchart for explaining a processing procedure of processing for setting logical volumes for causing a server to recognize the logical volumes.

FIG. 36 is a flowchart for explaining a processing procedure of processing for setting logical volumes for causing the server to recognize the logical volumes. As shown in FIG. 36, first, the storage RM 25 groups logical volumes of RAID devices and sets affinity groups (step S301).

The affinity groups are information indicating a correspondence relation between LUNs (Logical Unit Numbers) recognized by the server and LV (Logical Volume) numbers in the RAID devices.

Figure 37:
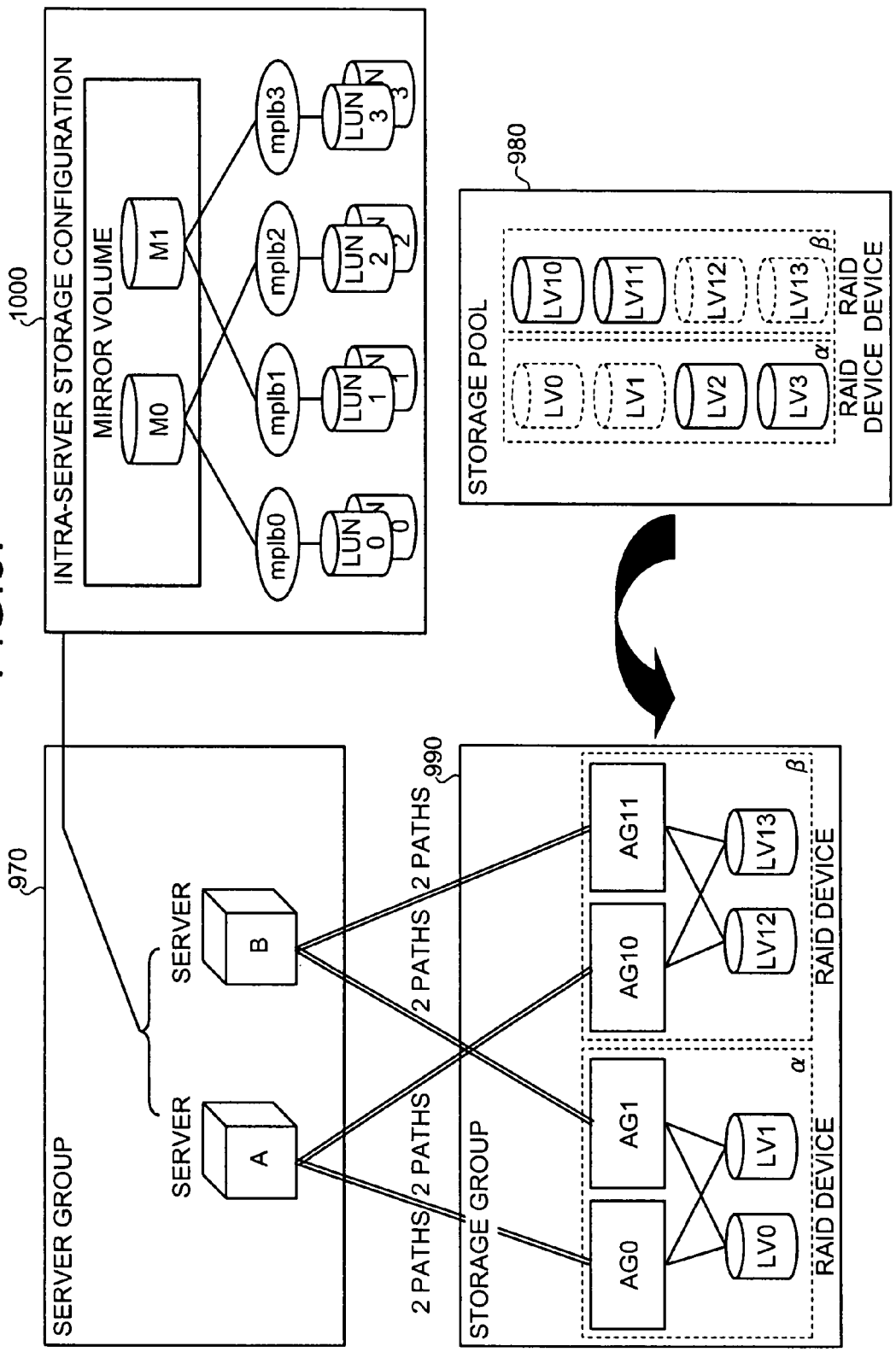
FIG. 37 is a diagram for explaining processing for setting logical volumes established in RAID devices.

FIG. 37 is a diagram for explaining processing for setting logical volumes established in RAID devices. In FIG. 37, a server group 970 constituted by a server "A" and a server "B" and a storage pool 980 constituted by a RAID device "α", in which logical volumes "LV0", "LV1", "LV2", and "LV3" are established, and a RAID device "β", in which logical volumes "LV10", "LV11", "LV12", and "LV13" are established, are shown.

Moreover, in FIG. 37, a storage group 990 added with the logical volumes "LV0" and "LV1" of the RAID device "α" and the logical volumes "LV12" and "LV13" of the RAID device "β" from the storage pool 980 is shown.

The logical volumes "LV0" and "LV1" of the RAID device "α" added to the storage group 990 are set to belong to an affinity group "AG0" and an affinity group "AG1". The logical volumes "LV12" and "LV13" of the RAID device "β" are set to belong to an affinity group "AG10" and an affinity group "AG11".

Figure 38:
FIG. 38 is a table of an example of affinity group data that stores information on affinity groups.

FIG. 38 is a table of an example of affinity group data 1010 that stores information on affinity groups. The affinity group data 1010 stores information on a RAID device name, an affinity group name, a LUN, and an LV.

The RAID device name is identification information for identifying respective RAID devices. The affinity group name is identification information of affinity groups set in the respective RAID devices. The LUN is identification information for identifying logical volumes when a server A or a server B accesses the logical volumes. The LV is identification information for identifying the logical volumes.

Returning to the explanation of FIG. 36, the storage RM 25 checks redundant paths between the servers "A" and "B" and the logical volumes "LV0", "LV11", "LV12", and "LV13" and selects paths to set access paths (step S302).

Figure 39:
FIG. 39 is a table of an example of multipath configuration data that stores information on a structure of multipath.

The storage RM 25 sets multipath for the logical units (step S303). FIG. 39 is a table of an example of multipath configuration data 1020 that stores information on a structure of multipath.

The multipath configuration data 1020 stores information on a multi-path instance name and a LUN. The multi-path instance name is information for identifying instances of the multipath set. The LUN is information corresponding to the multi-path instances set and identifying logical units recognized by the server "A" or the server "B".

The storage RM 25 registers, as elements of mirror volumes, the set multi-path instances in cluster resources of servers that perform clustering (step S304). Thereafter, the storage RM 25 sets, using the multi-path instances registered in the cluster sources, mirror volume groups including volumes of different RAID devices as pairs (step S305).

In FIG. 37, an intra-server storage configuration 1000 internally set in the server "A" or the server "B" is shown. In the storage structure 1000, a mirror volume "M0" constituted by a multi-path instance "mplb0" and a multi-path instance "mplb2" and a mirror volume "M1" constituted by a multi-path instance "mplb1" and a multi-path instance "mplb3" are set.

Figure 40:
FIG. 40 is a table of an example of mirror volume configuration data that stores information on a structure of mirror volumes.

FIG. 40 is a diagram of an example of mirror volume configuration data 1030 that stores information on a structure of mirror volumes. The mirror volume configuration data 1030 stores information on a mirror volume and a structure disk.

The mirror volume is identification information for identifying the mirror volumes set. The structure disk is identification information for identifying logical units constituting the mirror volumes. In the structure disk, the information on the multi-path instances in the multipath configuration data 1020 shown in FIG. 39 is stored. It is possible to specify LUNs corresponding to the mirror volumes by referring to the multipath configuration data 1020.

The affinity group data 1010 shown in FIG. 38 is stored in the system resource DB 26 and the RAID devices by the storage RM 25. The multipath configuration data 1020 shown in FIG. 39 and the mirror volume configuration data 1030 shown in FIG. 40 are stored in the system resource DB 26 by the storage RM 25 and stored in the servers as management targets by the storage RM agent 115a.

Returning to the explanation of the processing for creating a software image at step S105 shown in FIG. 4, the network RM 24 performs setting of networks for the servers registered in the server groups.

Specifically, the network RM 24 reads, from the inter-server-group link data 830 shown in FIG. 28, information on a network group having the server groups added with the servers as a front server group and a back server group.

Moreover, the network RM 24 reads the network group data 850 shown in FIG. 30 and extracts front network sub-groups and back network sub-groups corresponding to the network group.

Thereafter, the network RM 24 reads the network sub-group data 660 shown in FIG. 17, retrieves network sub-groups corresponding to the front network sub-groups and the back network sub-groups, and allocates IP addresses to the servers based on information on sub-networks allocated to the network sub-groups.

Figure 41:
FIG. 41 is a table of an example of IP address management data that stores information on IP addresses allocated to servers.

FIG. 41 is a table of an example of IP address management data 1040 that stores information on the IP addresses allocated to the servers. The IP address management data 1040 is stored in the system resource DB 26 by the system resource manager 21.

The IP address management data 1040 stores information on an IP address and an allocation destination. The IP address is information on the IP addresses allocated to the servers. The allocation destination is information for identifying the servers as allocation destinations of the IP addresses.

Subsequently, the network RM 24 allocates, based on the load distribution group data 840 shown in FIG. 29 and the network group data 850 shown in FIG. 30, a load distribution group having a representative IP address to the network groups corresponding to the server groups added with the servers. At this point, a load distribution function of a load balancer is in a stopped state.

Thereafter, the user installs software such as an OS, which is installed in the servers, in the storage sub-groups associated with the servers added to the server groups. The storage sub-groups are constituted using the technology of the SAN.

After the installation is finished, the software sub RM 53 creates a software image formed by an aggregate of software such as an OS, a device driver, and application software in cooperation with the software RM 23 and the software RM agent 113a and stores the software image created in the domain resource DB 55.

Specifically, the software RM 23 reads the middleware cooperation IF data 330 shown in FIG. 8. The software RM agent 113a transmits a command required to be executed before software image sampling to the AP managing unit 116a, which is a functional unit realized by middleware.

In other words, the software RM agent 113a transmits a command for stopping the function of the AP managing unit 116a and stops the function of the AP managing unit 116a. The software sub RM 53 shuts down systems of the servers. Moreover, the software sub RM 53 performs network boot of the servers using a provisional OS stored in the domain resource DB 55 of the domain management server 50 for the servers.

Thereafter, the software sub RM 53 creates a software image of software installed in the servers booted up. The software RM 23 registers information on the software image in the system resource DB 26 as software image management data 1050 explained below.

FIG. 42 is a table of an example of the software image management data 1050 that stores information on software images. The software image management data 1050 stores information on a software image name, a format, an OS attribute, and a software name.

The software image name is a name of a software image. The format is information indicating whether the software image is created in an archive format or a patch format. The OS attribute is information indicating whether the software image is a software image of an OS. The software name is a name of software for which the software image is created.

Moreover, the software sub RM 53 creates, based on the software image created, a software distribution image distributed for other servers. Specifically, the software sub RM 53 creates a software distribution image including a set of software images of a plurality of pieces of software installed in a storage for a first server.

The system resource manager 21 stores information on the software distribution image in the system resource DB 26 as software distribution image management data 1060 explained below.

FIG. 43 is a table of an example of the software distribution image management data 1060 that stores information on software distribution images. The software distribution image management data 1060 stores information on a software distribution image name, the number of copies, a server architecture name, and a software image/snapshot name.

The software distribution image name is a name of a software distribution image. The number of copies is the number of copies of the software distribution image. The server architecture name is identification information for identifying a CPU architecture of a server to which the software distribution image is distributed. The software image/snapshot name is identification information for identifying a software image or a snapshot included in the software distribution image.

The snapshot is a software image of software installed in the server at a specific point in time. The system resource manager 21 registers information on the snapshot in the system resource DB 26 as snapshot management data 1070 explained below.

FIG. 44 is a table of an example of the snapshot management data 1070 that stores information on a snapshot. The snapshot management data 1070 stores information on a snapshot name and a software image name. The snap shot name is a name of the snapshot. The software image name is identification information for identifying a software image included in the snapshot.

Thereafter, the software RM 23 reads the middleware cooperation IF data 330 shown in FIG. 8. The software RM agent 113a transmits a command required to be executed after software image sampling to the AP managing unit 116a, which is a functional unit realized by middleware.

Specifically, the software RM agent 113a transmits a command for starting the AP managing unit 116a stopped and starts the AP managing unit 116a. The network RM 24 applies setting of a VLAN to the switches to connect the server to the VLAN, starts the load distribution function of the load balancer, and allocates the server as an object server to which loads are distributed.

Thereafter, the system resource manager 21 reads the middleware cooperation IF data 330 shown in FIG. 8 and transmits a command required to be executed after server group creation to the AP-management control unit 27, which is a functional unit realized by middleware.

Specifically, the system resource manager 21 transmits a command for causing the AP-management control unit 27 to recognize addition of a server group to the AP-management control unit 27. The AP-management control unit 27 performs installation, setting, and the like of application programs in the server in cooperation with the AP managing unit 116a and sets the server in a state in which the server is usable in jobs.

Returning to the explanation of FIG. 4, the system resource manager 21 performs processing for adding second and subsequent servers to the server group (step S106). The processing performed at step S106 is explained in detail below.

Figure 45:
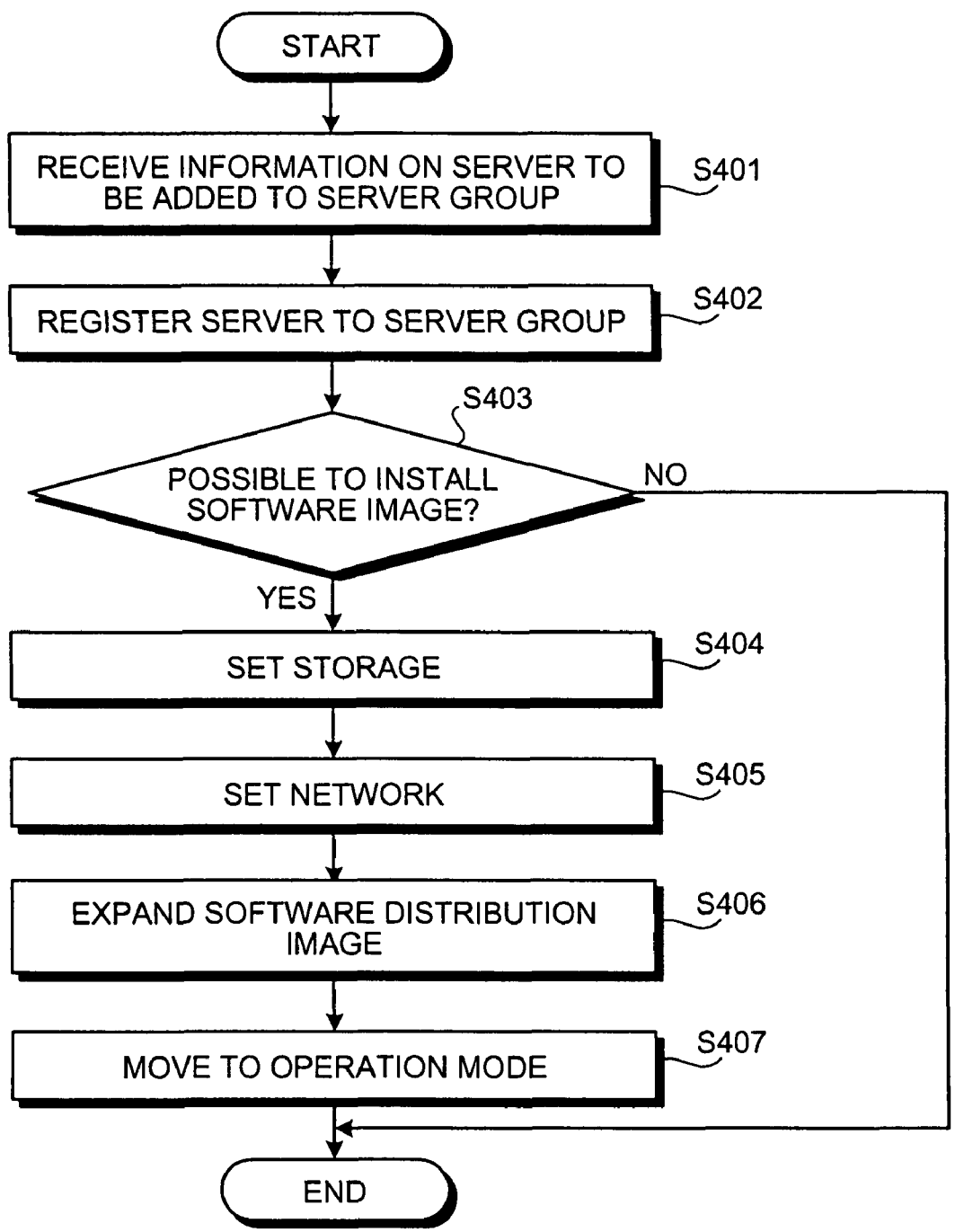
FIG. 45 is a flowchart for explaining a processing procedure of processing for adding a server to a server group.

FIG. 45 is a flowchart for explaining a processing procedure of processing for adding a server to a server group. As shown in FIG. 45, first, when the user operates the operation management client 10 to designate a server and a server group in which the server is registered, the system resource manager 21 receives information on the server and the server group (step S401).

The system resource manager 21 registers the server in the server group (step S402). Subsequently, the system resource manager 21 reads the management target server data 700 shown in FIG. 21 and the software distribution image management data 1060 shown in FIG. 43 and checks whether a server architecture of the server is capable of introducing a software image (step S403). When the server architecture of the server is not capable of introducing a software image (step S403, No), the system resource manager 21 finishes the processing for adding the server to the server group.

When the server architecture of the server is capable of introducing a software image (step S403, Yes), the storage RM 25 performs processing for setting a storage for the server in the same method as the setting of the storage in the first server (step S404). Specifically, the storage RM 25 executes the processing for setting logical volumes explained with reference to FIGS. 31 and 36 on the server.

Subsequently, the network RM 24 performs network boot for the server registered in the server group using a provisional OS and performs setting of a network for the server in the same method as the setting of the network in the first server (step S405).

Thereafter, the software sub RM 53 expands the software distribution image created from the software installed in the first server to a storage sub-group associated with the second server and boots up the server again using the software expanded (step S406).

When the software distribution image is expanded to the storage sub-group associated with the server, the software RM 23 stores information on the software distribution image distributed in the system resource DB 26.

FIG. 46 is a table of an example of distribution management data 1080 that stores information on distribution states of software distribution images. The distribution management data 1080 stores information on a server name, a storage sub-group name, a software distribution image name, the number of copies, and a state.

The server name is information for identifying servers to which storage sub-groups are allocated. The storage sub-group name is information for identifying storage sub-groups to which software distribution images are expanded. The software distribution image name is information for identifying the software distribution images expanded to the storage sub-groups. The number of copies is information on the number of copies of the software distribution images distributed. The state is information indicating distribution states of the software distribution images.

Returning to the explanation of FIG. 45, the system resource manager 21 performs processing for shifting the second server to a job mode in cooperation with the network RM 24 and the AP-management control unit 27 (step S407).

Specifically, when the server is booted up again, the network RM 24 allocates an IP address to the second server based on the sub-network to which the first server belongs. Information on the IP address allocated to the second server is stored in the IP address management data 1040 shown in FIG. 41 by the system resource manager 21.

Subsequently, the network RM 24 applies setting of a VLAN to the switches to connect the server to the VLAN and causes the load balancer to register the server as an object server to which loads are distributed.

Thereafter, the system resource manager 21 transmits a command for causing the AP-management control unit 27 to recognize addition of the server in the server group to the AP-management control unit 27. The AP-management control unit 27 performs installation, setting, and the like of application programs in the server in cooperation with the AP managing unit 116*a* and sets the server in a state in which the server is usable in jobs.

When third and subsequent servers are added to the server group, the processing for adding a server explained with reference to FIG. 45 is repeated.

Processing for deleting a server added to a server group from the server group is explained. FIG. 47 is a flowchart for explaining a processing procedure of server deletion processing for deleting a server from a server group.

As shown in FIG. 47, first, the network RM 24 disconnects a VLAN set in the server in cooperation with the network sub RM 54 (step S501). The network RM 24 changes, in cooperation with the network sub RM 54, the setting of the load balancer and excludes the server from object servers to which loads are distributed (step S502).

Subsequently, the network RM 24 returns an IP address allocated to the server (step S503). The software sub RM 53 boots up the server again according to network boot using the provisional OS stored in the domain resource DB 55 of the domain management server 50 (step S504).

The storage RM 25 deletes a disk allocated to the server deleted from the server group (step S505). Thereafter, the storage RM 25 changes SAN zoning, which is a logical connection relation between the server and storages, set for the server and sets SAN zoning between servers excluding the server and the storages (step S506).

Various output screens output to the operation management client 10 by the system resource manager 21 in resource allocation management processing are explained. FIG. 48 is a diagram of an example of a resource-arrangement output screen 1090 showing an arrangement of resources as management targets.

As shown in FIG. 48, the resource-arrangement output screen 1090 is constituted to allow the user to grasp at a glance how various servers belonging to a Web domain 1100, an AP domain 1110, and a DB domain 1120 and storages belonging to a storage domain 1130 are connected.

Figure 49:
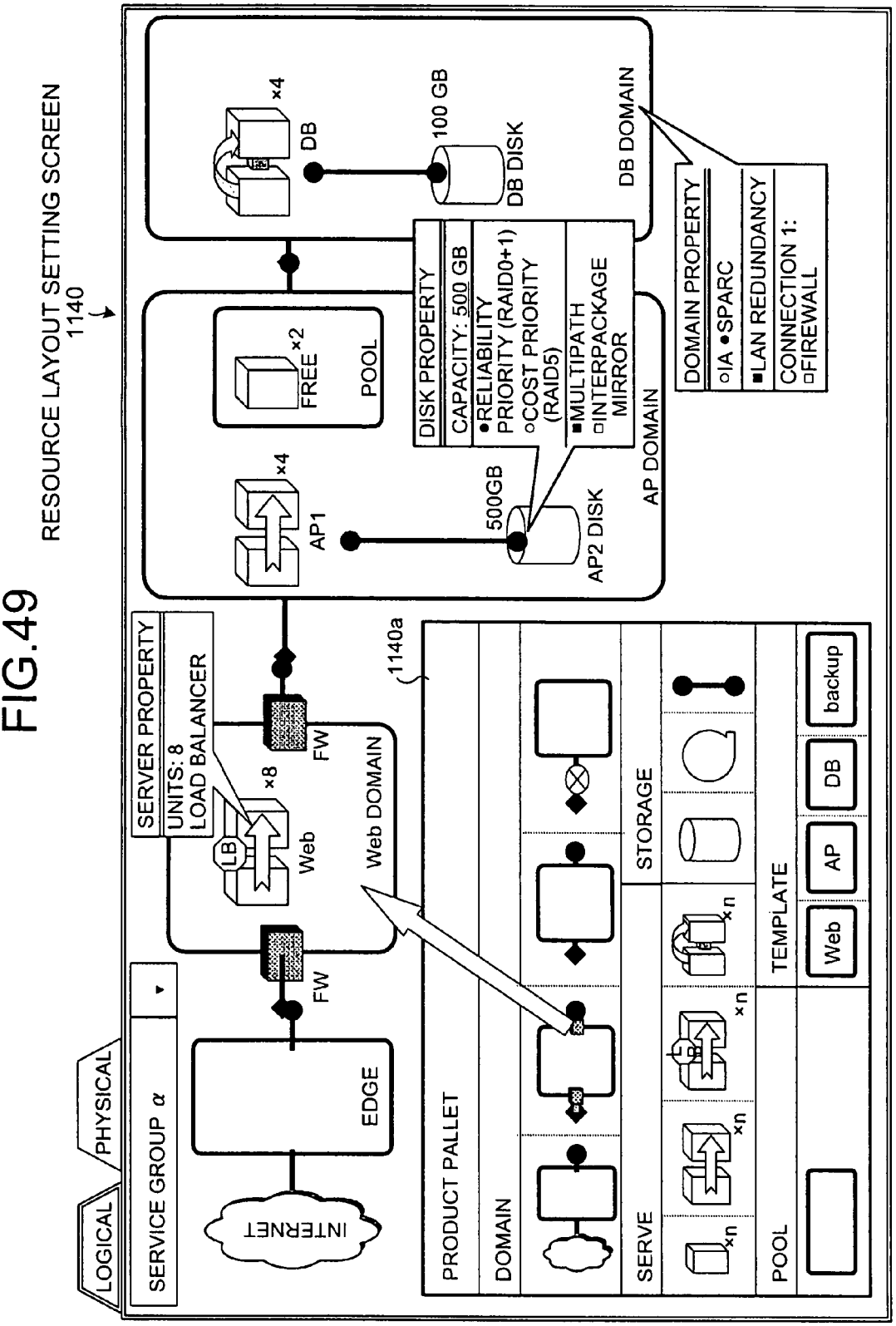
FIG. 49 is a diagram of an example of a resource-arrangement setting screen on which a setting concerning an arrangement of resources is received from a user.

FIG. 49 is a diagram of an example of a resource-arrangement setting screen 1140 that receives a setting for an arrangement of resources from the user. In the resource-arrangement setting screen 1140, a parts pallet 1140*a* is output. The user can determine an arrangement of various resources by operating a mouse or the like to arrange various icons of servers, storages, and the like in the parts pallet.

Figure 50:
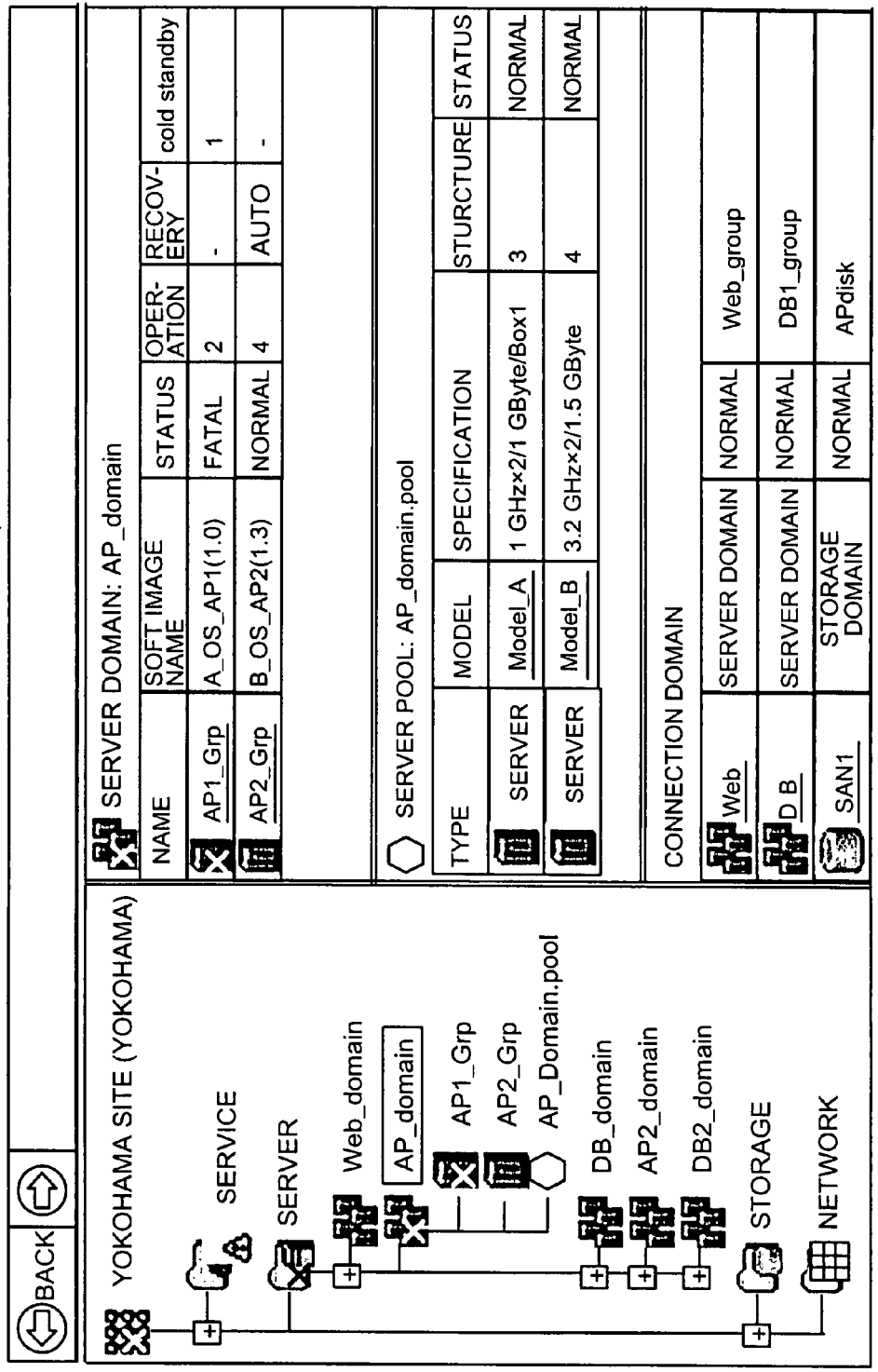
FIG. 50 is a diagram of an example of a server-group list screen on which a list of server groups belonging to a server domain is output.

FIG. 50 is a diagram of an example of a server-group list screen 1150 on which a list of server groups belonging to a server domain is output. On the server-group list screen 1150, when a server domain is designated according to operation of the mouse or the like by the user, a list of server groups belonging to the server domain and a list of pooled servers that can be added to the server groups are output.

Figure 51:
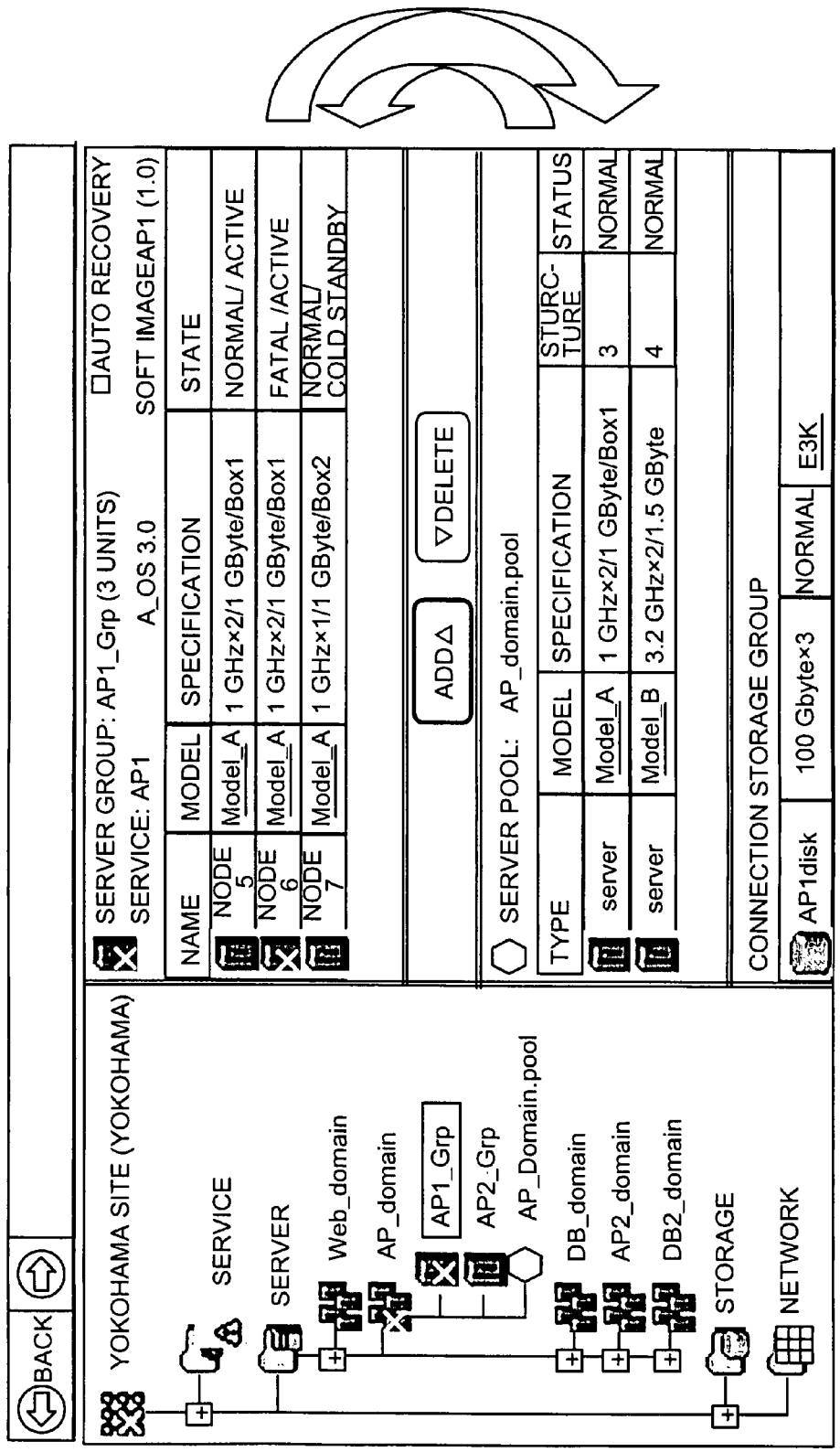
FIG. 51 is a diagram of an example of a server list screen on which a list of servers belonging to a server group is output.

FIG. 51 is a diagram of an example of a server list screen 1160 on which a list of servers belonging to a server group is output. On the server list screen 1160, when a server group is designated according to operation of the mouse or the like by the user, a list of servers belonging to the server group and a list of pooled servers that can be added to the server group are output.

Moreover, on the server list screen 1160, when a pooled server is designated according to operation of the mouse or the like by the user and an addition button is clicked, a request for execution of processing for adding the server designated to the server group is transmitted to the system resource manager 21 and the processing for adding the server is executed.

On the server list screen 1160, when a server belonging to the server group is designated according to operation of the mouse or the like by the user and a deletion button is clicked, a request for execution of processing for deleting the server designated from the server group is transmitted to the system resource manager 21 and the processing for deleting the server is executed.

Figure 52:
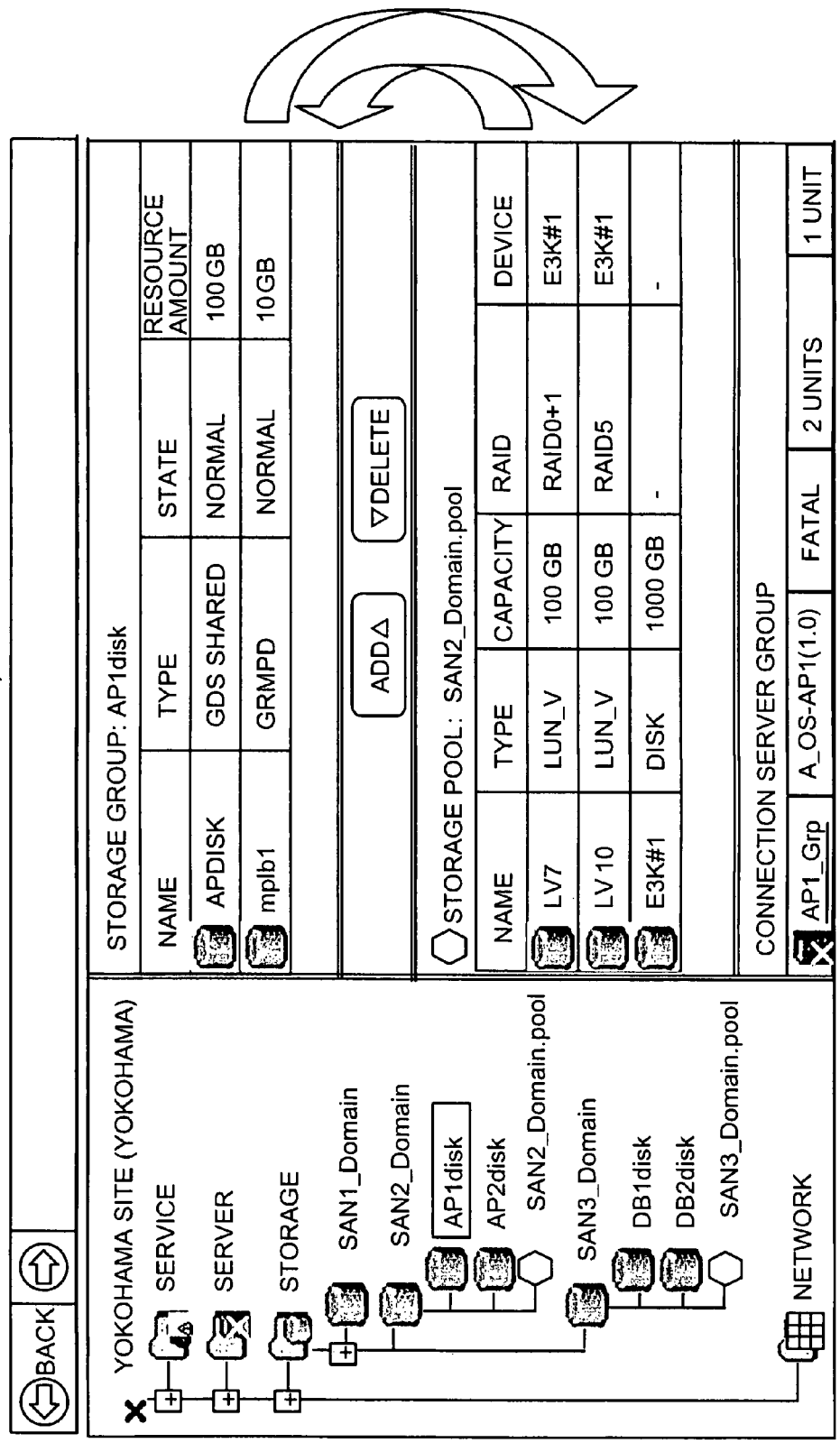
FIG. 52 is a diagram showing an example of a storage list screen on which a list of storages belonging to a storage group is output.

FIG. 52 is a diagram of an example of a storage list screen 1170 on which a list of storages belonging to a storage group is output. On the storage list screen 1170, like the server list screen 1160 shown in FIG. 51, when a storage group is designated according to operation of the mouse or the like by the user, a list of storages belonging to the storage group and a list of pooled storages that can be added to the storage group are output.

On the storage list screen 1170, when a pooled storage is designated according to operation of the mouse or the like by the user and an addition button is clicked, a request for execution of processing for adding the storage designated to the storage group is transmitted to the system resource manager 21 and the processing for adding the storage is executed.

On the storage list screen 1170, when a storage belonging to the storage group is designated according to operation of the mouse or the like by the user and a deletion button is clicked, a request for execution of processing for deleting the storage designated from the storage group is transmitted to the system resource manager 21 and the processing for deleting the storage is executed.

Figure 53:
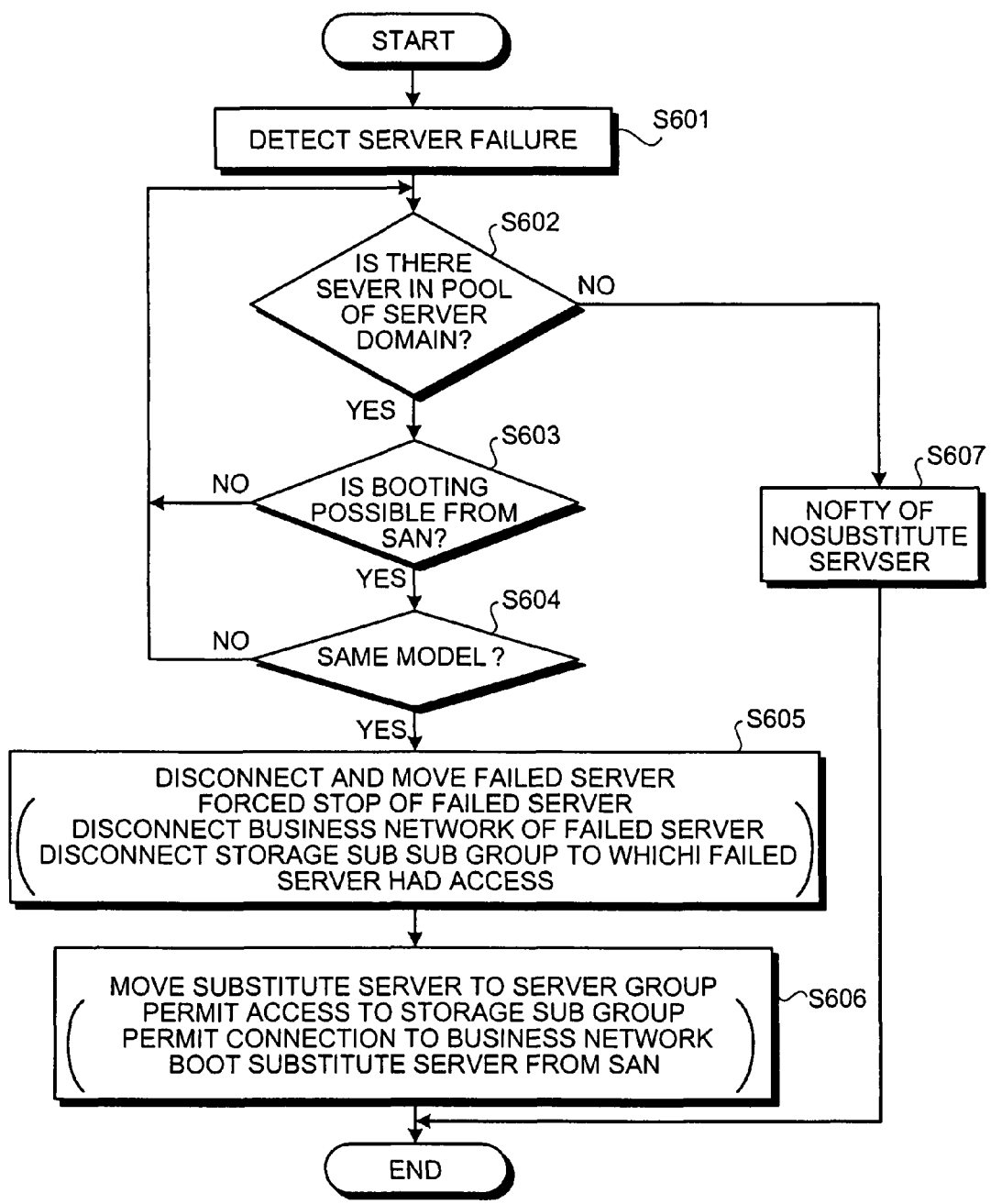
FIG. 53 is a flowchart for explaining a processing procedure of server recovery processing by an operation management program according to the embodiment.

A processing procedure of server recovery processing by the operation management program according to the embodiment is explained. FIG. 53 is a flowchart for explaining a processing procedure of the server recovery processing by the operation management program according to the embodiment.

As shown in the figure, when the server RM 22 detects a server failure (step S601), the operation management program judges, using the provisioning configuration data 960 shown in FIG. 35, whether there are servers in a pool of a server domain to which the failed server belongs (step S602).

As a result, when there are servers in the pool of the server domain to which the failed server belongs, the operation management program selects one of the servers and judges, using the management target server data 700 shown in FIG. 21, whether the server can be booted up on the SAN (step S603). When the server can be booted up on the SAN, the operation management program judges, using the management target server data 700, whether the server is a model identical with the failed server (step S604).

When the server is a model identical with the failed server, since it is possible to use the server as a substitute server, the system resource manager 21 separates the failed server and moves the failed server to the pool. The system resource manager 21 causes the server RM 22 to forcibly stop the failed server and move the failed server to the pool, causes the network RM 24 to disconnect a network connected to the failed server, and causes the storage RM 25 to disconnect a storage sub-group to which the failed server accessed (step S605).

The system resource manager 21 incorporates the substitute server in the server group. The system resource manager 21 causes the storage RM 25 to permit an access of the substitute server to the storage sub-group to which the failed server accessed, causes the network RM 24 to connect the substitute server to the network connected to the failed server, and causes the server RM 22 to boot up the substitute server on the SAN (step S606).

On the other hand, when the server selected from the pool of the server domain cannot be booted up on the SAN or when the server is a model different from the failed server, the operation management program returns to step S602 and searches for another server from the pool of the server domain. When there is no server that can be booted up on the SAN, which is the model identical with the failed server in the pool of the server domain, the operation management program notifies an operation administrator that there is no substitute server (step S607).

In this way, the server RM 22 selects the substitute server that can be booted up on the SAN, which is the model identical with the failed server from the pool of the server domain. The system resource manager 21 separates the failed server, moves the failed server to the pool, and incorporates the substitute server in the server group. Consequently, it is possible to quickly cope with the server failure.

Figure 54:
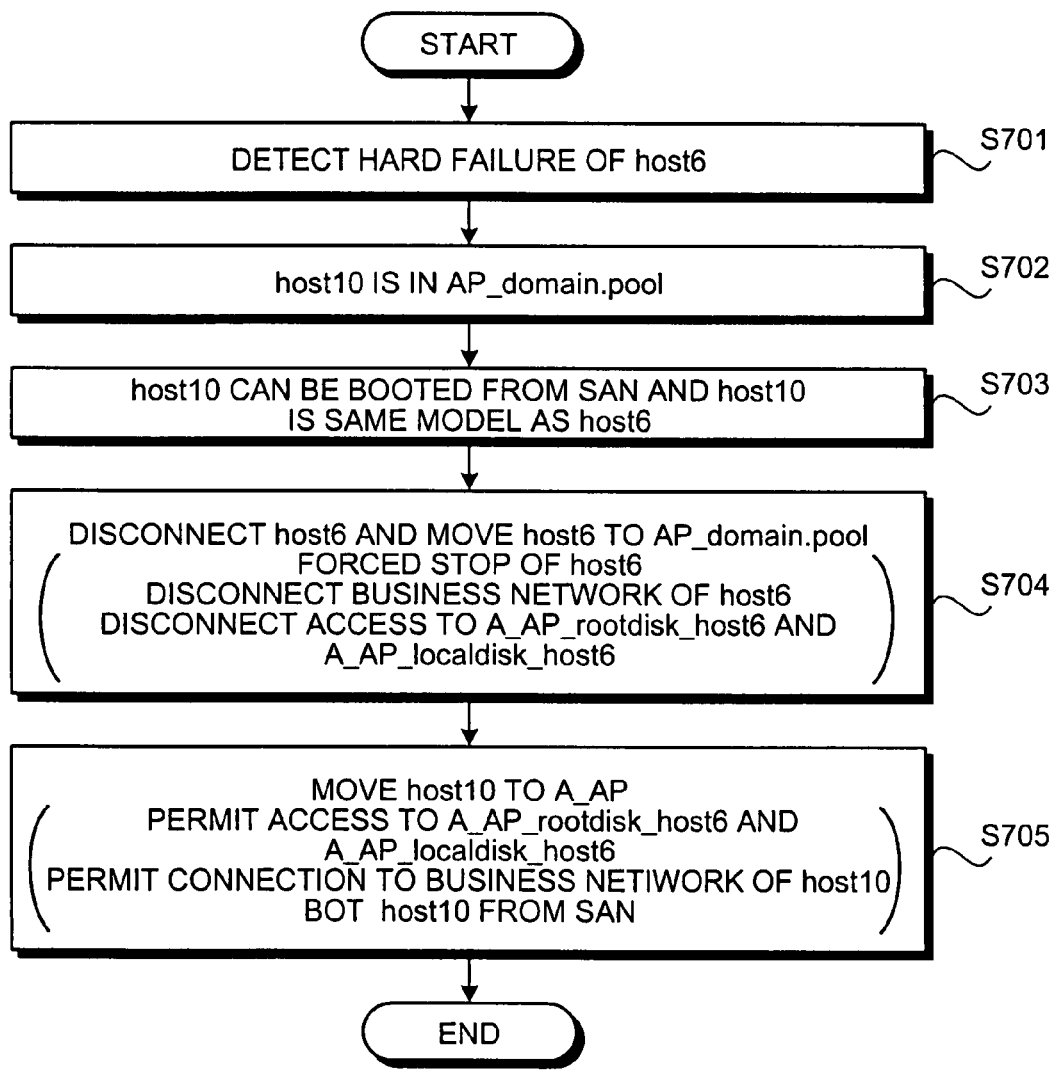
FIG. 54 is a flowchart for explaining an example of the server recovery processing by the operation management program according to the embodiment.

An example of server recovery processing by the operation management program according to the embodiment is explained. FIG. 54 is a flowchart for explaining the example of the server recovery processing by the operation management program according to the embodiment.

As shown in the figure, in this example of the server recovery processing, when the server RM 22 detects a hardware failure of a "host6" (step S701), since the "host6" belongs to an AP_domain", the server RM 22 selects a server "host10" from a "AP_domain.pool" using the provisioning configuration data 960 shown in FIG. 35 (step S702).

The server RM 22 checks, using the management target server data 700 shown in FIG. 21, that the "host10" can be booted up on the SAN, which is a model identical with the "host6" (step S703). The system resource manager 21 separates the "host6" and moves the "host6" to the "AP_domain..pool" pool. The system resource manager 21 causes the server RM 22 to forcibly stop the "host6" and move the "host6" to the pool, causes the network RM 24 to disconnect a network connected to the "host6", and causes the storage RM 25 to disconnect an access to an "A_AP_rootdisk_host6" and an "A_AP_localdisk_host6" to which the "host6" accessed (step S704).

The system resource manager 21 incorporates the "host10" in an "A_AP". The system resource manager 21 causes the storage RM 25 to permit an access of the "host10" to the "A_AP_rootdisk_host6" and the "A_AP_localdisk_host6", causes the network RM 24 to connect the "host10" to a network connected to the failed server, and causes the server RM 22 to boot up the "host10" on the SAN (step S705).

Figure 55:
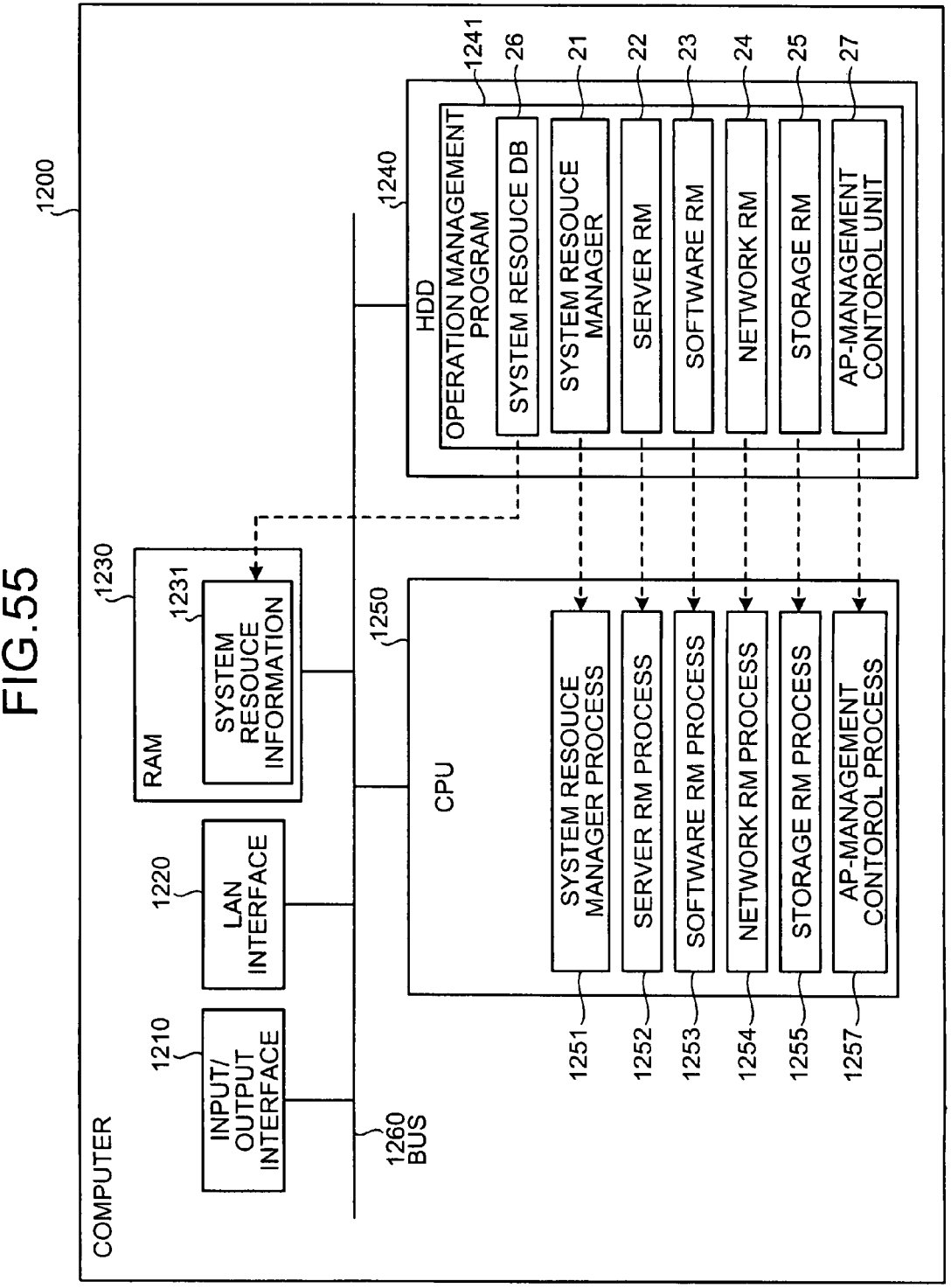
FIG. 55 is a diagram of a computer that executes the operation management program according to the embodiment.

A computer that executes the operation management program according to the embodiment is explained. FIG. 55 is a diagram of the computer that executes the operation management program according to the embodiment. A computer 1200 corresponds to the site management server 20 shown in FIG. 4.

As shown in FIG. 55, the computer 1200 is constituted by connecting an input/output interface 1210, a LAN interface 1220, a RAM 1230, an HDD 1240, and a CPU 1250 to a bus 1260.

The input/output interface 1210 is an interface that connects input devices such as a mouse and a keyboard and a display device such as a liquid crystal display. The LAN interface 1220 is an interface that connects the computer 1200 to a LAN.

The RAM 1230 is a storage device that stores programs executed by the CPU 1250, data read out from the HDD 1240, and the like. The HDD 1240 is a hard disk device installed with an operation management program 1241. System resource information 1231 read out from the system resource DB 26 is stored in the RAM 1230.

The CPU 1250 is a central processing unit that executes the operation management program 1241 installed in the HDD 1240. The system resource manager 21, the server RM 22, the software RM 23, the network RM 24, the storage RM 25, and the AP-management control unit 27 of the operation management program 1241 are executed as a system resource manager process 1251, a server RM process 1252, a software RM process 1253, a network RM process 1254, a storage RM process 1255, and an AP supervision managing unit process 1256 (translator's comment: "AP supervision managing unit process 1256" should be corrected to "AP-management control unit process 1256"), respectively.

The operation management program 1241 is stored in "portable physical media" such as a flexible disk (FD), a CD-ROM, an MO disk, a DVD disk, a magneto-optical disk, and an IC card, "other computers" connected to the computer 1200 via a network such as the Internet, and the like and installed in the HDD 1240.

As described above, in the embodiment, when the server RM 22 finds a failure in a server in operation, the system resource manager 21 selects, using information of the system resource DB 26, a substitute server from a pool of a server domain to which the failed server belongs, separates the failed server from a job network and a storage sub-group and moves the failed server to the pool, permits the substitute server to access a storage group to which the failed server accessed and make connection to the job network to which the failed server was connected, and boots up the substitute server on the SAN. Thus, it is possible to efficiently and surely perform automatic recovery from the server failure.

In the above explanation of the embodiment, the server domain is constituted by the three domains, namely, the Web domain 4, the AP domain 5, and the DB domain 6. However, the present invention is not limited to this scheme. It is also possible to apply the present invention when a different number of domains are used.

In the above explanation of the embodiment, a substitute server belonging to a server domain to which a failed server belongs is used. However, the present invention is not limited to this scheme. It is also possible to apply the present invention as long as the failed server and the substitute server can be booted up on the SAN from an identical disk.

As described above, according to one aspect of the present invention, the failed server is efficiently and surely switched to the substitute server. Thus, there is an effect that it is possible to efficiently and surely perform recovery from a failure of a server in operation.

Furthermore, according to another aspect of the present invention, the connection of the boot disk on the SAN is switched to the substitute server without connecting the substitute server and the SAN. Thus, there is an effect that it is possible to efficiently perform the recovery.

Moreover, according to still another aspect of the present invention, it is possible to assign the substitute server even when a failure occurs in any one of the server in operations belonging to the server domain. Thus, there is an effect that it is possible to perform the recovery at low cost.

Furthermore, according to still another aspect of the present invention, it is possible to easily switch the failed server to the substitute server. Thus, there is an effect that it is possible to efficiently perform the recovery.

Moreover, according to still another aspect of the present invention, reliability of the connection between the servers and the boot disk on the SAN is improved. Thus, there is an effect that it is possible to surely perform the recovery.

Furthermore, according to still another aspect of the present invention, reliability of the boot disk on the SAN is improved. Thus, there is an effect that it is possible to surely perform the recovery.

Moreover, according to still another aspect of the present invention, even when a failure occurs in a server connected to the network, it is possible to surely switch the server to the substitute server. Thus, there is an effect that it is possible to surely perform recovery from a failure of a server connected to the network and operated.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for managing an operation of a plurality of servers that is booted up using a boot disk on a storage area network, the computer program causing a computer to execute:
    managing a group of servers connected to the boot disk by the storage area network as a server domain, a group of servers currently not operated from among the servers belonging to the server domain being managed as a server domain pool, the managing including managing a plurality of server domains;
    switching, when a failure occurs in any one of operating servers, a connection of the boot disk on the storage area network from a failed server to a substitute server belonging to a server domain to which the failed server belongs, the switching including:
        selecting the substitute server from the server domain pool of the server domain,
        switching the connection of the boot disk on the storage area network to the substitute server selected at the selecting, and
        moving the failed server to the server domain pool; and
    booting the substitute server using the boot disk on the storage area network of which the connection is switched to the substitute server at the switching.

2. The computer-readable recording medium according to claim 1, wherein:
    each of the servers belonging to the server domain is connected to the boot disk on the storage area network by a storage-area-network switch, and
    the switching includes switching the connection of the boot disk on the storage area network from the failed server to the substitute server by operating the storage-area-network switch.

3. The computer-readable recording medium according to claim 2, wherein the storage-area-network switch provides a plurality of paths between the servers and the boot disk on the storage area network.

4. The computer-readable recording medium according to claim 1, wherein the boot disk on the storage area network is a disk device based on a redundant-array-of-independent-disks system.

5. The computer-readable recording medium according to claim 1, wherein:
    the server domain is a group of servers further having a uniform physical wire connection with a network, and
    the computer program further causes the computer to execute switching a connection of the network from the failed server to the substitute server.

6. A method of managing an operation of a plurality of servers that is booted up using a boot disk on a storage area network, the method comprising:
    managing a group of servers connected to the boot disk by the storage area network as a server domain, a group of servers currently not operated from among the servers belonging to the server domain being managed as a server domain pool, the managing including managing a plurality of server domains;
    switching, when a failure occurs in any one of operating servers, a connection of the boot disk on the storage area network from a failed server to a substitute server belonging to a server domain to which the failed server belongs, the switching including:
        selecting the substitute server from the server domain pool of the server domain
        switching the connection of the boot disk on the storage area network to the substitute server selected at the selecting, and
        moving the failed server to the server domain pool; and
    booting the substitute server using the boot disk on the storage area network of which the connection is switched to the substitute server at the switching.

7. The method according to claim 6, wherein:
    each of the servers belonging to the server domain is connected to the boot disk on the storage area network by a storage-area-network switch, and
    the switching includes switching the connection of the boot disk on the storage area network from the failed server to the substitute server by operating the storage-area-network switch.

8. The method according to claim 7, wherein the storage-area-network switch provides a plurality of paths between the servers and the boot disk on the storage area network.

9. The method according to claim 6, wherein the boot disk on the storage area network is a disk device based on a redundant-array-of-independent-disks system.

10. The method according to claim 6, wherein:
    the server domain is a group of servers further having a uniform physical wire connection with a network, and
    the method further comprises switching a connection of the network from the failed server to the substitute server.

11. An apparatus for managing an operation of a plurality of servers that is booted up using a boot disk on a storage area network, the apparatus comprising:
    a server-domain managing unit that manages a group of servers connected to the boot disk by the storage area network as a server domain, a group of servers currently not operated from among the servers belonging to the server domain being managed as a server domain pool, the server-domain managing unit managing a plurality of server domains;
    a boot-disk switching unit that switches, when a failure occurs in any one of operating servers, a connection of the boot disk on the storage area network from a failed server to a substitute server belonging to a server domain to which the failed server belongs, the boot-disk switching unit:
        selecting the substitute server from the server domain pool of the server domain,
        switching the connection of the boot disk on the storage area network to the substitute server selected by the selecting unit, and moving the failed server to the server domain pool; and a substitute-server booting unit that boots up the substitute server using the boot disk on the storage area network of which the connection is switched to the substitute server by the boot-disk switching unit.

12. The apparatus according to claim 11, wherein:

each of the servers belonging to the server domain is connected to the boot disk on the storage area network by a storage-area-network switch, and the boot-disk switching unit switches the connection of the boot disk on the storage area network from the failed server to the substitute server by operating the storage-area-network switch.

13. The apparatus according to claim 12, wherein the storage-area-network switch provides a plurality of paths between the servers and the boot disk on the storage area network.

14. The apparatus according to claim 11, wherein the boot disk on the storage area network is a disk device based on a redundant-array-of-independent-disks system.

15. The apparatus according to claim 11, wherein:

the server domain is a group of servers further having a uniform physical wire connection with a network, and the apparatus further comprises a network switching unit that switches a connection of the network from the failed server to the substitute server.

* * * * *